(12) United States Patent
Kim

(10) Patent No.: US 11,847,271 B2
(45) Date of Patent: Dec. 19, 2023

(54) INPUT DEVICE INCLUDING RESONANCE CIRCUIT AND INTERFACE DEVICE INCLUDING THE SAME

(71) Applicant: SAMSUNG DISPLAY CO., LTD., Yongin-si (KR)

(72) Inventor: Chul Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/806,470

(22) Filed: Jun. 10, 2022

(65) Prior Publication Data

US 2023/0062749 A1    Mar. 2, 2023

(30) Foreign Application Priority Data

Aug. 25, 2021    (KR) .................. 10-2021-0112659

(51) Int. Cl.
| | | |
|---|---|---|
| G06F 3/041 | (2006.01) | |
| G06F 3/038 | (2013.01) | |
| G06F 3/0354 | (2013.01) | |
| G06F 3/046 | (2006.01) | |

(52) U.S. Cl.
CPC ........ *G06F 3/0383* (2013.01); *G06F 3/03545* (2013.01); *G06F 3/046* (2013.01); *G06F 3/04162* (2019.05)

(58) Field of Classification Search
CPC ............... G06F 3/0383; G06F 3/04162; G06F 3/03545; G06F 3/046
See application file for complete search history.

(56) References Cited

U.S. PATENT DOCUMENTS

| | | | |
|---|---|---|---|
| 10,509,491 B2 | 12/2019 | Yamamoto | |
| 10,768,723 B2 | 9/2020 | Katsurahira et al. | |
| 2013/0106718 A1 | 5/2013 | Sundara-Rajan | |
| 2015/0002425 A1 | 1/2015 | Lee et al. | |
| 2015/0123940 A1 | 5/2015 | Park et al. | |
| 2016/0062511 A1* | 3/2016 | Park ..................... | G06F 3/04186 |
| | | | 345/174 |
| 2017/0285772 A1 | 10/2017 | Yamamoto | |
| 2019/0204939 A1* | 7/2019 | Ju ........................ | G06F 3/04162 |
| 2020/0110475 A1* | 4/2020 | Files ..................... | G06F 1/1656 |

FOREIGN PATENT DOCUMENTS

| | | |
|---|---|---|
| KR | 10-2017-0132754 | 12/2017 |
| KR | 10-2021-0045522 | 4/2021 |
| WO | WO 2015/191807 | 12/2015 |

* cited by examiner

*Primary Examiner* — Lisa S Landis
(74) *Attorney, Agent, or Firm* — F. CHAU & ASSOCIATES, LLC

(57) ABSTRACT

An input device includes a housing, a power supply disposed within the housing, a controller disposed within the housing and that receives power from the power supply, a resonance circuit disposed within the housing and that generates a first type signal based on a signal received from the controller, and a conductor disposed within the housing and that transfers a second type signal received from the controller, and the first type signal and the second type signal have different waveforms from each other.

20 Claims, 19 Drawing Sheets

INPUT DEVICE INCLUDING RESONANCE CIRCUIT AND INTERFACE DEVICE INCLUDING THE SAME

CROSS-REFERENCE TO RELATED APPLICATIONS

This application claims priority under 35 U.S.C. § 119 to Korean Patent Application No. 10-2021-0112659 filed on Aug. 25, 2021, in the Korean Intellectual Property Office, the disclosures of which are incorporated by reference herein in their entireties.

TECHNICAL FIELD

The present disclosure relates to an input device and, more particularly, to an input device and an interface device including the same.

DISCUSSION OF THE RELATED ART

Multimedia electronic devices such as televisions, smart phones, tablet computers, navigation devices, and game consoles may include an electronic device for displaying an image. Such electronic devices may include, not only a display panel for displaying an image, but also an input sensor capable of providing a touch-based input method that allows a user to intuitively and conveniently input information or a command in addition to a conventional input method such as a button, a keyboard, or a mouse.

The input sensor may sense a touch or pressure applied thereto by the user's body, for example, a finger. However, many users find it helpful to use a touch instrument such as a stylus to perform input operations with more accuracy, particularly when engaged in writing, sketching or drawing.

SUMMARY

An input device includes a housing, a power supply disposed within the housing, a controller disposed within the housing and receiving power from the power supply, a resonance circuit disposed within the housing and generating a first type signal based on a signal received from the controller, and a conductor disposed within the housing and transferring a second type signal received from the controller. The first type signal and the second type signal have different waveforms from each other.

The first type signal may have a waveform with a varying amplitude, and the second type signal may have a waveform with a uniform amplitude.

The input device may further include a multiplexer connected between the conductor and the controller, and between the resonance circuit and the controller. The multiplexer may transfer the signal received from the controller to the resonance circuit or may transfer the second type signal to the conductor.

The input device may further include a first pen/stylus tip connected to the conductor, and a second pen/stylus tip connected to the resonance circuit.

The input device may further include a pen/stylus tip selectively connected to the conductor or the resonance circuit.

The input device may further include a multiplexer connected between the pen/stylus tip and the conductor and between the pen/stylus tip and the resonance circuit. The multiplexer may transfer the first type signal to the pen/stylus tip, or may transfer the second type signal to the pen/stylus tip.

The controller may generate a downlink signal according to a predetermined protocol.

The downlink signal may include both the first type signal and the second type signal.

The downlink signal may include a position signal and a data signal, the position signal may include the first type signal, and the data signal may include the second type signal.

The downlink signal may include a position signal and a data signal, and the position signal and the data signal may each include the first type signal.

The predetermined protocol may be a universal stylus initiative (USI), an active electrostatic protocol (AES), or a MICROSOFT pen protocol (MPP).

An interface device includes an electronic device including a display layer and a sensor layer disposed on the display layer. An input device outputs a first type signal or a downlink signal including the first type signal to the electronic device. The first type signal has an amplitude that is varied over time.

The electronic device and the input device may communicate according to a predetermined protocol. The electronic device may provide an uplink signal to the input device. The downlink signal may include a position signal and a data signal.

The position signal may include the first type signal, the data signal may include the first type signal or a second type signal, and the second type signal may have a waveform with a uniform amplitude.

The predetermined protocol may be a universal stylus initiative (USI), an active electrostatic protocol (AES), or a MICROSOFT pen protocol (MPP).

The input device may include a housing, a power supply disposed within the housing, a controller disposed within the housing and receiving power from the power supply, a resonance circuit disposed within the housing and generating the first type signal based on a signal received from the controller, and a conductor disposed within the housing and transferring a second type signal received from the controller. The first type signal and the second type signal may have different waveforms from each other.

The input device may further include a multiplexer connected between the conductor and the controller, and between the resonance circuit and the controller. The multiplexer may transfer the signal received from the controller to the resonance circuit or may transfer the second type signal to the conductor.

The input device may further include a first pen/stylus tip connected to the conductor, and a second pen/stylus tip connected to the resonance circuit.

The input device may further include a pen/stylus tip selectively connected to the conductor or the resonance circuit, and a multiplexer connected between the pen/stylus tip and the conductor, and between the pen/stylus tip and the resonance circuit. The multiplexer may transfer the first type signal to the pen/stylus tip or may transfer the second type signal to the pen/stylus tip.

An input device includes a power supply, a controller receiving power from the power supply and determining a type of a signal, and a resonance circuit receiving the signal from the controller and outputting a magnetic field. The controller generates a downlink signal according to a predetermined protocol, and at least a portion of the downlink signal is provided as the magnetic field through the resonance circuit.

An active stylus including a housing, a first circuit disposed within the housing and configured to generate a first signal, and a second circuit disposed within the housing and configured to generate a second signal. The first signal has a waveform with varying amplitude and the second signal has a waveform with a constant amplitude.

The first circuit may be a resonance circuit and the second circuit may be a controller.

The active stylus may further include a multiplexer for selectively activating either the first signal or the second signal.

The active stylus may further include a first pen tip connected to the first signal and a second pen tip connected to the second signal

BRIEF DESCRIPTION OF THE FIGURES

The above and other objects and features of the present disclosure will become apparent by describing in detail embodiments thereof with reference to the accompanying drawings, wherein.

DETAILED DESCRIPTION

Figure 1A:
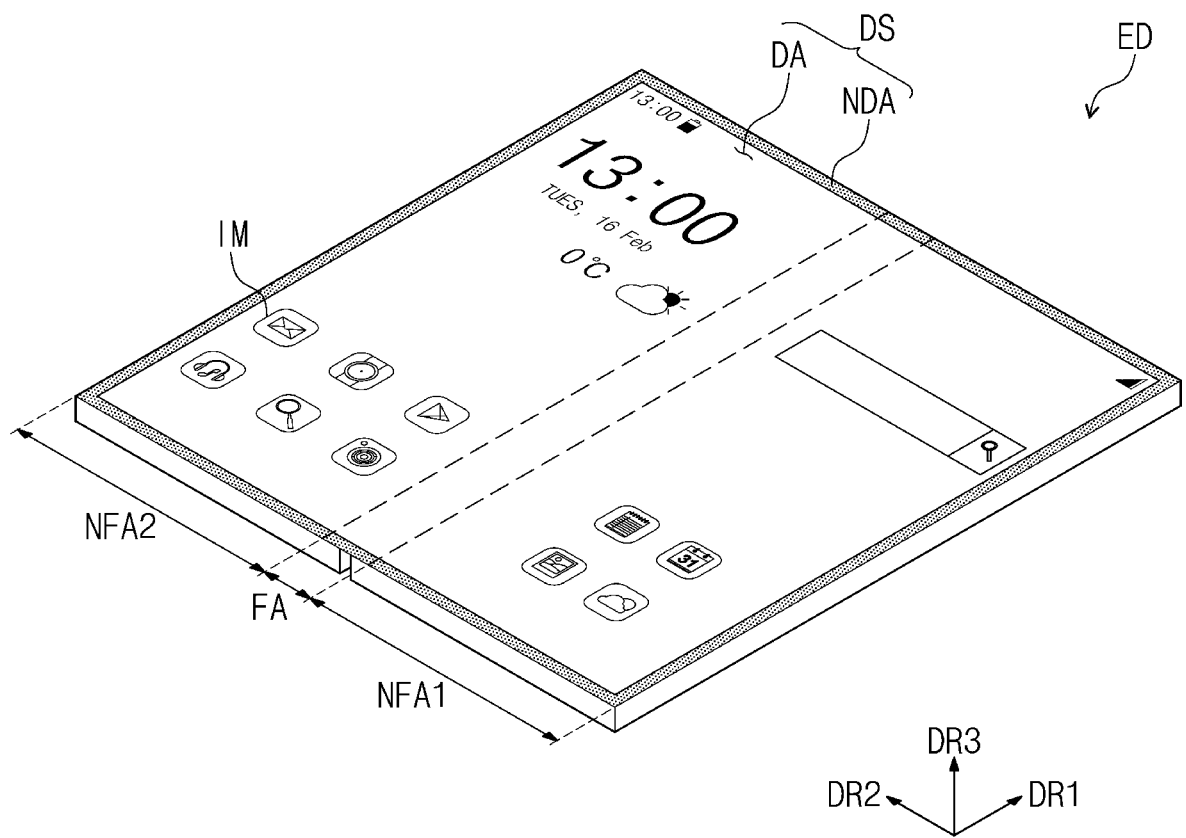
FIG. 1A is a perspective view of an electronic device in an unfolded state according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals may refer to like components throughout the specification and the figures. The term "and/or" includes one or more combinations of the associated listed items.

The terms "first", "second", etc. may be used to describe various components, but the components are not necessarily limited by the terms. The terms may be used to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terms "part" and "unit" mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-code, circuits, data, databases, data structures, tables, arrays or variables.

Hereinafter, embodiments of the present disclosure will be described with reference to accompanying drawings.

Figure 1B:
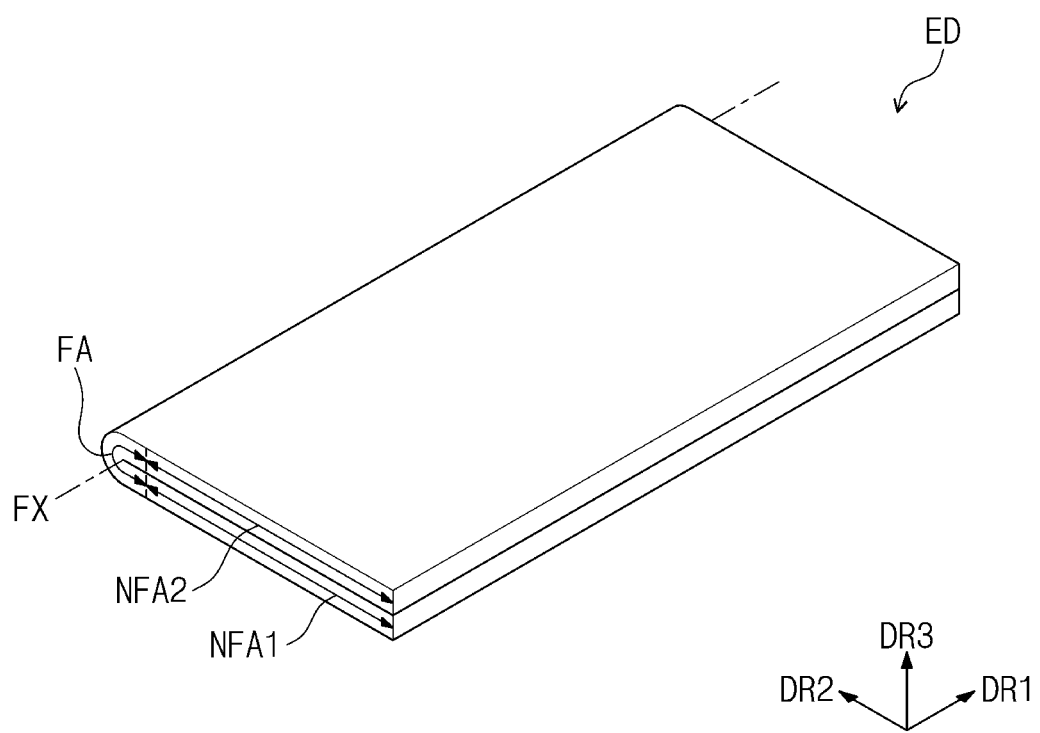
FIG. 1B is a perspective view of an electronic device in a folded state according to an embodiment of the present disclosure.

FIGS. 1A and 1B are perspective views of an electronic device ED according to an embodiment of the present disclosure. FIG. 1A illustrates an unfolded state of the electronic device ED, and FIG. 1B illustrates a folded state of the electronic device ED.

Referring to FIGS. 1A and 1B, the electronic device ED may be a device activated according to an electrical signal. For example, the electronic device ED may be a smart phone, a foldable smart phone, a tablet computer, a car navigation system, a game console, or a wearable device such as a smart watch, but is not necessarily limited thereto.

FIGS. 1A and 1B illustrate that the electronic device ED is a foldable smart phone but is not necessarily limited thereto.

The electronic device ED, according to an embodiment of the present disclosure, may include a display surface DS defined by a first direction DR1 and a second direction DR2 intersecting the first direction DR1. The electronic device ED may display an image IM to the user through the display surface DS.

The display surface DS may include a display area DA and a non-display area NDA adjacent to the display area DA. The display area DA may display the image IM, and the non-display area NDA might not display the image IM. The non-display area NDA may at least partially surround the display area DA. However, the present disclosure is not necessarily limited thereto, and a shape of the display area DA and a shape of the non-display area NDA may be changed.

Hereinafter, a direction perpendicular to the plane defined by the first direction DR1 and the second direction DR2 is defined as a third direction DR3. Also, in the present specification, "on a plane" may be defined as a state viewed from the third direction DR3.

The electronic device ED may include a folding area FA (or a foldable area) and a plurality of non-folding areas NFA1 and NFA2. The non-folding areas NFA1 and NFA2 may include the first non-folding area NFA1 and the second non-folding area NFA2. The folding area FA may be disposed between the first non-folding area NFA1 and the second non-folding area NFA2. The first non-folding area NFA1, the folding area FA, and the second non-folding area NFA2 may be sequentially defined in the electronic device ED along the second direction DR2. However, it may be understood that the electronic device ED may include more than two folding areas and more than three non-folding areas. In this case, the non-folding areas and the folding areas may be alternately arranged one by one. Where there is more than one folding area, they may extend parallel to each other or may extend in different directions.

As illustrated in FIG. 1B, the folding area FA may be folded based on a folding axis FX parallel to the first direction DR1. The folding area FA may extend in the first direction DR1. The folding area FA may be folded to a predetermined curvature and a predetermined radius of curvature. The first non-folding area NFA1 and the second non-folding area NFA2 may face each other, and the electronic device ED may be in-folded such that the display surface DS is not exposed to the outside.

In an embodiment of the present disclosure, the electronic device ED may be out-folded such that the display surface DS is exposed to the outside and can continue to be viewed, even when in the folded state. In an embodiment of the present disclosure, the electronic device ED may be configured such that an in-folding operation or an out-folding operation is repeated from an unfolding operation but the present disclosure is not necessarily limited thereto. In an embodiment of the present disclosure, the electronic device ED may be placed within an unfolded state by an unfolding operation, an in-folded state by an in-folding operation, and/or an out-folded state by an out-folding operation.

The foldable electronic device ED is described as an example in FIGS. 1A and 1B, but the present disclosure is not necessarily limited thereto. For example, the electronic device ED may be replaced with various electronic devices such as a rigid electronic device, for example, an electronic device in which the folding area FA is not defined, a rollable electronic device, or a slideable electronic device.

Figure 2:
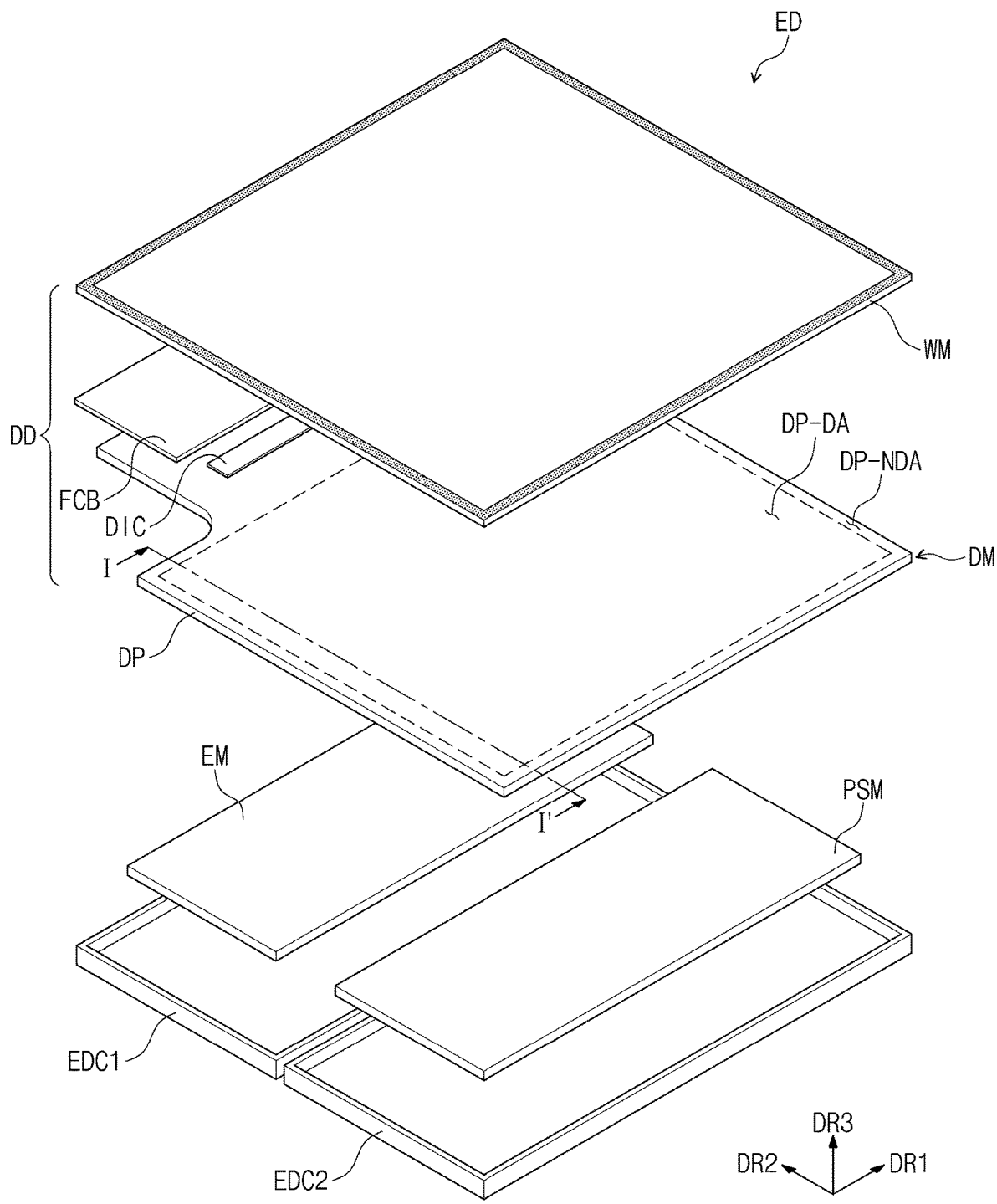
FIG. 2 is an exploded perspective view of an electronic device according to an embodiment of the present disclosure.

FIG. 2 is an exploded perspective view of an electronic device according to an embodiment of the present disclosure.

Referring to FIG. 2, the electronic device ED may include a display device DD, an electronic module EM, a power supply module PSM, and cases EDC1 and EDC2. The electronic device ED may further include a mechanical structure for controlling a folding operation of the display device DD.

The display device DD generates an image and senses an external input. The display device DD includes a window module WM and a display module DM. The window module WM provides a front surface of the electronic device ED through which the image may be viewed.

The display module DM may include at least a display panel DP. Although the display module DM is illustrated as being the same as the display panel DP in FIG. 2, the display module DM may be a stacked structure in which a plurality of components are stacked. A detailed description of the stacked structure of the display module DM will be described later.

The display panel DP includes a display area DP-DA and a non-display area DP-NDA corresponding to the display area DA (e.g., as shown in FIG. 1A) and the non-display area NDA (e.g., as shown in FIG. 1A) of the electronic device ED, respectively. In this specification, "area/portion corresponds to area/portion" means overlapping and is not necessarily limited to having the same shape or area. The display module DM may include a driving chip DIC disposed on the non-display area DP-NDA. The display module DM may further include a flexible circuit film FCB coupled to the non-display area DP-NDA.

The driving chip DIC may include driving elements for driving pixels of the display panel DP, for example, a data driving circuit. Although FIG. 2 illustrates a structure in which the driving chip DIC is mounted on the display panel DP, the present disclosure is not necessarily limited thereto. For example, the driving chip DIC may be mounted on the flexible circuit film FCB.

The electronic module EM includes at least a main driver. The electronic module EM may include a wireless communication module, a camera module, a proximity sensor module, an image input module, a sound input module, a sound output module, a memory, an external interface module, etc. The electronic module EM is electrically connected to the power supply module PSM.

The main driver (or a main controller) controls the overall operation of the electronic device ED. For example, the main driver activates and/or deactivates the display device DD according to a user input. The main driver may control operations of the display device DD and other modules. The main driver may include at least one microprocessor.

The cases EDC1 and EDC2 accommodate the display module DM, the electronic module EM, and the power supply module PSM. Although the two cases EDC1 and EDC2 are illustrated as separate components, this is an example, the present disclosure is not necessarily limited thereto. The electronic device ED may further include a hinge structure for connecting the two cases EDC1 and EDC2 to each other. The cases EDC1 and EDC2 may each be coupled to the window module WM. The cases EDC1 and EDC2 protect components accommodated in the cases EDC1 and EDC2, such as the display module DM, the electronic module EM, and the power supply module PSM.

Figure 3A:
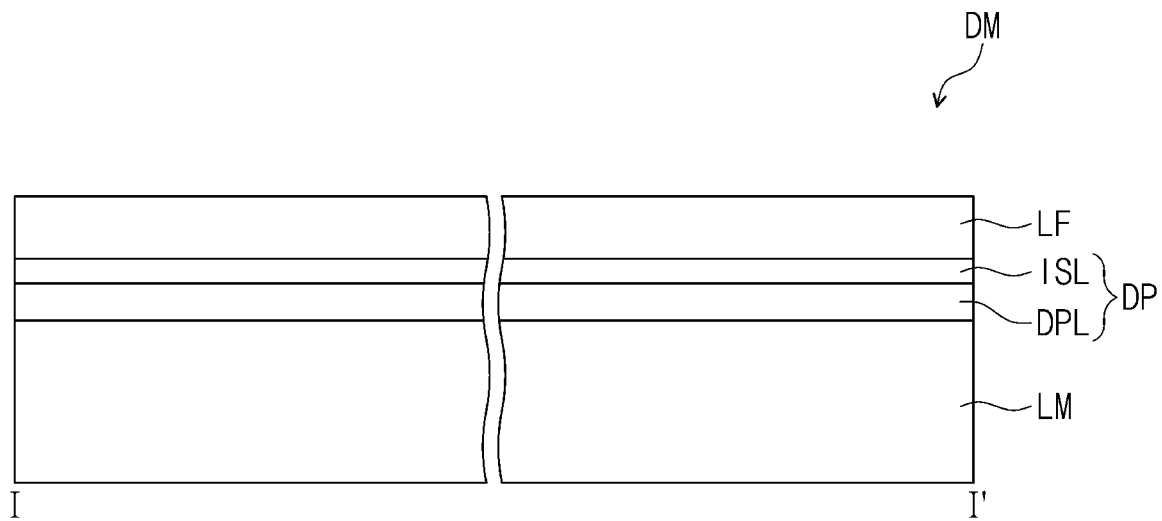
FIG. 3A is a cross-sectional view of a display module according to an embodiment of the present disclosure.
Figure 3A:
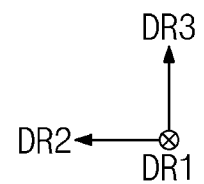

FIG. 3A is a cross-sectional view of a display module according to an embodiment of the present disclosure.

Referring to FIG. 3A, the display module DM may include the display panel DP, an optical film LF disposed on the display panel DP, and a lower member LM disposed under the display panel DP. The display panel DP may include a display layer DPL and a sensor layer ISL disposed on the display layer DPL. An adhesive layer may be disposed between the aforementioned members as needed.

The display layer DPL may be configured to generate an image. The display layer DPL may be a light emitting display layer. For example, the display layer DPL may be an organic light emitting display layer, an inorganic light emitting display layer, an organic-inorganic light emitting display layer, a quantum dot display layer, a micro LED display layer, or a nano LED display layer.

The sensor layer ISL may be disposed on the display layer DPL. The sensor layer ISL may sense an external input applied from an external source. The sensor layer ISL may be an external sensor attached to the display layer DPL, and the sensor layer ISL may be an integrated sensor continuously formed during a fabricating process of the display layer DPL.

The optical film LF may lower a reflectance of light incident from the outside. The optical film LF may include a phase retarder and/or a polarizer. The optical film LF may include at least a polarizing film. Alternatively, the optical film LF may include color filters. The color filters may have a predetermined arrangement. The arrangement of the color filters may be determined in consideration of emission light colors of pixels PX included in the display layer DPL. In addition, the optical film LF may further include a black matrix adjacent to the color filters. Alternatively, the optical film LF may include a destructive interference structure. For example, the destructive interference structure may include a first reflective layer and a second reflective layer disposed on different layers. The first reflected light and the second reflected light respectively reflected from the first and second reflective layers may be destructively interfered, and thus external light reflectance may be reduced. The optical film LF may he omitted.

The lower member LM may include various functional members. For example, the lower member LM may include a light blocking layer that blocks light incident to the display layer DPL, a shock absorption layer that absorbs an external impact, a support layer that supports the display layer DPL, and/or a heat dissipation layer that releases heat generated in the display layer DPL.

Figure 3B:
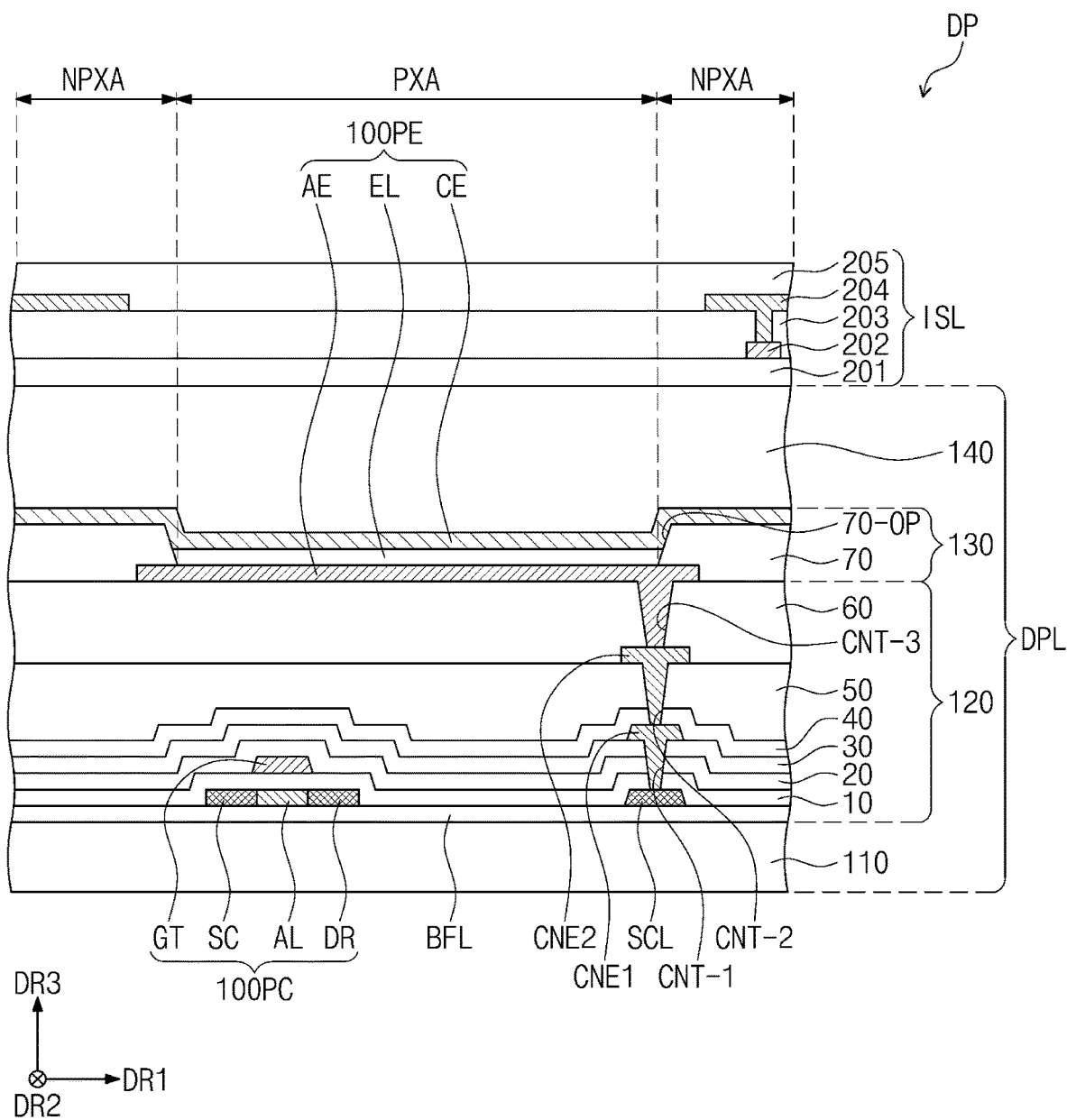
FIG. 3B is a cross-sectional view of a display panel according to an embodiment of the present disclosure.

FIG. 3B is a cross-sectional view of the display panel DP according to an embodiment of the present disclosure.

Referring to FIG. 3B, the display layer DPL may include a base layer 110, a circuit layer 120, a light emitting device layer 130, and an encapsulation layer 140.

The base layer 110 may provide a base surface on which the circuit layer 120 is disposed. The base layer 110 may be a glass substrate, a metal substrate, or a polymer substrate. However, the embodiment is not necessarily limited thereto, and the base layer 110 may be an inorganic layer, an organic layer, or a composite material layer.

The base layer 110 may have a multi-layer structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may each be referred to as a base barrier layer.

Each of the first and second synthetic resin layers may include a polyimide-based resin. In addition, each of the first and second synthetic resin layers may include an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and/or a perylene-based resin. In the present specification, "~~"-based resin means including a functional group of "~~".

At least one inorganic layer is formed on an upper surface of the base layer 110. The inorganic layer may include aluminum oxide, titanium oxide, silicon oxide, silicon nitride, silicon oxynitride, zirconium oxide, and/or hafnium oxide. The inorganic layer may be formed in multiple layers. The multiple inorganic layers may constitute a barrier layer and/or a buffer layer. In this embodiment, the display layer DPL is illustrated as including a buffer layer BFL.

The buffer layer BFL may increase the bonding force between the base layer 110 and a semiconductor pattern. The buffer layer BFL may include silicon oxide, silicon nitride, and/or silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, the present disclosure is not necessarily limited thereto, and the semiconductor pattern may include amorphous silicon, low-temperature polycrystalline silicon, and/or an oxide semiconductor.

FIG. 3B illustrates some semiconductor patterns, and semiconductor patterns may be further disposed in other areas. The semiconductor pattern may be arranged in a specific rule across the pixels. The semiconductor pattern may have different electrical properties depending on whether it is doped or not doped. The semiconductor pattern may include a first region having high conductivity and a second region having low conductivity (e.g., the low conductivity being lower than the high conductivity). The first region may be doped with an N-type dopant or a P-type dopant. The P-type transistor may include a doped region doped with the P-type dopant, and the N-type transistor may include a doped region doped with the N-type dopant. The second region may be a non-doped region or a region doped at a lower concentration of dopant than the first region.

The conductivity of the first region is greater than that of the second region, and the first region may serve as an electrode or a signal line. The second region may correspond to an active (or a channel) of a transistor. For example, a portion of the semiconductor pattern may be the active of the transistor, another portion may be a source or drain of the transistor and still another portion may be a connection electrode or a connection signal line.

Each of the pixels may have an equivalent circuit including seven transistors, one capacitor, and a light emitting device, and the equivalent circuit diagram of the pixel may be modified in various forms. FIG. 3B illustrates one transistor 100PC and a light emitting device 100PE included in a pixel by way of example.

A source SC, an active region AL (or an active region), and a drain DR of the transistor 100PC may be formed from a semiconductor pattern. The source SC and the drain DR may extend in opposite directions from the active region AL on a cross-section. FIG. 3B illustrates a portion of a connection signal line SCL formed from the semiconductor pattern. The connection signal line SCL may be connected to the drain DR of the transistor 100PC on a plane.

A first insulating layer 10 may be disposed on the buffer layer BFL. The first insulating layer 10 may overlap the plurality of pixels in common and may cover the semiconductor pattern. The first insulating layer 10 may be an inorganic layer and/or an organic layer and may have a single-layer or multi-layer structure. The first insulating layer 10 may include aluminum oxide, titanium oxide, silicon oxide, silicon nitride, silicon oxynitride, zirconium oxide, and/or hafnium oxide. In this embodiment, the first insulating layer 10 may be a single-layer silicon oxide layer. The insulating layer of the circuit layer 120 to be described later as well as the first insulating layer 10 may be an inorganic layer and/or an organic layer and may have a single-layer or multi-layer structure. The inorganic layer may include at least one of the above-described materials but is not necessarily limited thereto.

A gate GT of the transistor 100PC is disposed on the first insulating layer 10. The gate GT may be a portion of the metal pattern. The gate GT at least partially overlaps the active region AL. In the process of doping the semiconductor pattern, the gate GT may serve as a mask.

A second insulating layer 20 is disposed on the first insulating layer 10 and may cover the gate GT. The second insulating layer 20 may overlap the pixels in common. The second insulating layer 20 may be an inorganic layer and/or an organic layer and may have a single-layer or multi-layer structure. The second insulating layer 20 may include silicon oxide, silicon nitride, and/or silicon oxynitride. In this embodiment, the second insulating layer 20 may have a multilayer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single-layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulation layer 40 and the fifth insulating layer 50.

A sixth insulating layer 60 is disposed on the fifth insulating layer 50 and may cover the second connection electrode CNE2. The sixth insulating layer 60 may be an organic layer.

The light emitting device layer 130 may be disposed on the circuit layer 120. The light emitting device layer 130 may include the light emitting device 100PE. For example, the light emitting device layer 130 may include an organic light emitting material, an inorganic light emitting material, an organic-inorganic light emitting material, a quantum dot, a quantum rod, a micro LED, and/or a nano LED. Hereinafter, the light emitting device 100PE is described as an organic light emitting device as an example but the disclosure is not necessarily limited thereto.

The light emitting device 100PE may include a first electrode AE, an emission layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60.

A pixel defining layer 70 is disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The display area DA (e.g., as shown in FIG. 1A) may include an emission area PXA and a non-emission area NPXA adjacent to the emission area PXA. The non-emission area NPXA may at least partially surround the light emission area PXA. In the present embodiment, the emission area PXA corresponds to a partial area of the first electrode AE exposed by the opening 70-OP.

The emission layer EL may be disposed on the first electrode AE. The emission layer EL may be disposed in an area corresponding to the opening 70-OP. For example, the emission layer EL may be formed separately in each of the pixels. When the emission layer EL is separately formed in each of the pixels, each of the emission layers EL may emit light of at least one color among blue, red, and green. However, the present disclosure is not necessarily limited thereto, and the emission layer EL may be connected to the pixels and provided in common. In this case, the emission layer EL may provide blue light or white light.

The second electrode CE may be disposed on the emission layer EL. The second electrode CE may have an integral shape and may be commonly disposed in a plurality of pixels.

A hole control layer may be disposed between the first electrode AE and the emission layer EL. The hole control layer may be commonly disposed in the emission area PXA and the non-emission area NPXA. The hole control layer may include a hole transport layer and may further include a hole injection layer. An electronic control layer may be disposed between the emission layer EL and the second electrode CE. The electron control layer may include an electron transport layer and may further include an electron injection layer. The hole control layer and the electron control layer may be formed in common in the plurality of pixels using an open mask.

The encapsulation layer 140 may be disposed on the light emitting device layer 130. The encapsulation layer 140 may include an inorganic layer, an organic layer, and an inorganic layer sequentially stacked, but the layers constituting the encapsulation layer 140 are not necessarily limited thereto.

The inorganic layers may protect the light emitting device layer 130 from moisture and oxygen, and the organic layer may protect the light emitting device layer 130 from foreign substances such as dust particles. The inorganic layers may include a silicon nitride layer, a silicon oxynitride layer, a silicon oxide layer, a titanium oxide layer, and/or an aluminum oxide layer. The organic layer may include, but is not necessarily limited to including, an acrylic-based organic layer.

The sensor layer ISL may include a base layer 201, a first conductive layer 202, a sensing insulating layer 203, a second conductive layer 204, and a cover insulating layer 205.

The base layer 201 may be an inorganic layer including silicon nitride, silicon oxynitride, and/or silicon oxide. Alternatively, the base layer 201 may be an organic layer including an epoxy resin, an acrylic resin, or an imide-based resin. The base layer 201 may have a single-layer structure or a multi-layer structure stacked along the third direction DR3.

Each of the first conductive layer 202 and the second conductive layer 204 may have a single-layer structure or a multi-layer structure stacked along the third direction DR3.

The single-layered conductive layer may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as PEDOT, metal nanowires, graphene, etc.

The multi-layered conductive layer may include metal layers. The metal layers may have, for example, a three-layer structure of titanium/aluminum/titanium. The multi-layered conductive layer may include at least one metal layer and at least one transparent conductive layer.

The sensing insulating layer 203 and/or the cover insulating layer 205 may include an inorganic layer. The inorganic layer may include aluminum oxide, titanium oxide, silicon oxide, silicon nitride, silicon oxynitride, zirconium oxide, and/or hafnium oxide.

The sensing insulating layer 203 and/or the cover insulating layer 205 may include an organic layer. The organic layer may include acrylic resin, methacrylic resin, polyisoprene, vinyl-based resin, epoxy-based resin, urethane-based resin, cellulose-based resin, siloxane-based resin, polyimide-based resin, polyamide-based resin, and/or perylene-based resin.

Figure 4:
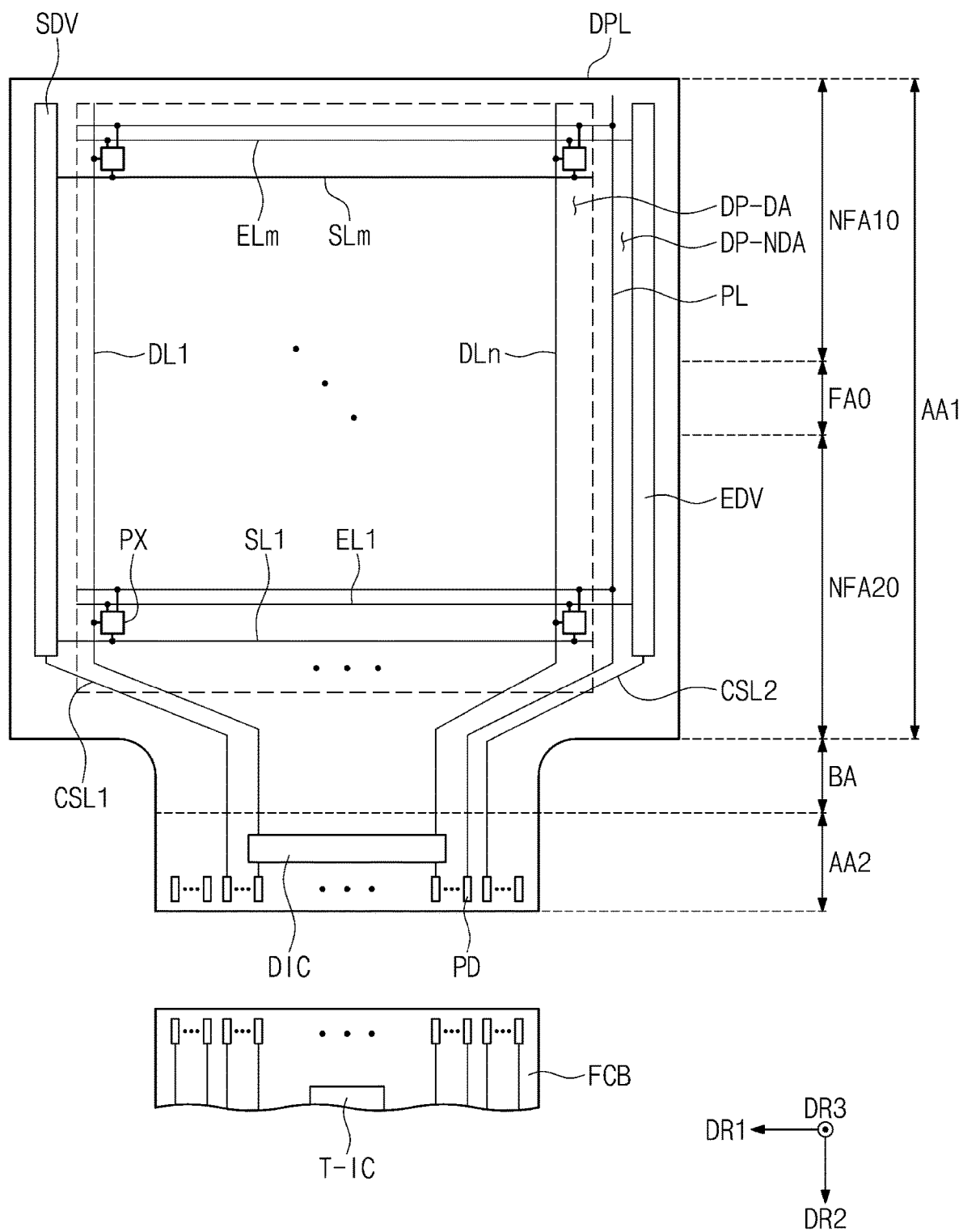
FIG. 4 is a plan view of a display layer according to an embodiment of the present disclosure.

FIG. 4 is a plan view of a display layer according to an embodiment of the present disclosure.

Referring to FIG. 4, the display area DP-DA and the non-display area DP-NDA at least partially surrounding the display area DP-DA may be defined in the display layer DPL. The display area DP-DA and the non-display area DP-NDA may be distinguished based on whether the pixel PX is disposed therein. The pixel PX is disposed in the display area DP-DA and not the non-display area DP-NDA. A scan driver SDV, a data driver, and an emission driver EDV may be disposed in the non-display area DP-NDA. The data driver may include one or more circuits configured in the driving chip DIC.

The display layer DPL may include a first panel area AA1, a bending area BA, and a second panel area AA2 defined along the second direction DR2. The second panel area AA2 and the bending area BA may be a partial area of the non-display area DP-NDA. The bending area BA is disposed between the first panel area AA1 and the second panel area AA2.

The first panel area AA1 corresponds to the display surface DS of FIG. 1A. The first panel area AA1 may include a first non-folding area NFA10, a second non-folding area NFA20, and a folding area FA0. The first non-folding area NFA10, the second non-folding area NFA20, and the folding area FA0 correspond to the first non-folding area NFA1, the second non-folding area NFA2, and the folding area FA of FIGS. 1A and 1B, respectively.

The width (or length) of the bending area BA and the width (or length) of the second panel area AA2 parallel to the first direction DR1 may be less than the width (or length) of the first panel area AA1 parallel to the first direction DR1. An area having a short length in the direction of a bending axis may be bent more easily.

The display layer DPL may include a plurality of pixels PX, a plurality of scan lines SL1 to SLm, a plurality of data lines DL1 to DLn, a plurality of emission lines EL1 to ELm, first and second control lines CSL1 and CSL2, a power line PL, and a plurality of pads PD. In this case, 'm' and 'n' each represent a positive integer. The pixels PX may be connected to the scan lines SL1 to SLm, the data lines DL1 to DLn, and the emission lines EL1 to ELm.

The scan lines SL1 to SLm may extend in the first direction DR1 and may be electrically connected to the scan driver SDV. The data lines DL1 to DLn may extend in the second direction DR2 and may be electrically connected to the driving chip DIC through the bending area BA. The emission lines EL1 to ELm may extend in the first direction DR1 and may be electrically connected to the emission driver EDV.

The power line PL may include a portion extending in the second direction DR2 and a portion extending in the first direction DR1. The portion extending in the first direction DR1 and the portion extending in the second direction DR2 of the power line PL maybe disposed on different layers. The portion of the power line PL extending in the second direction DR2 may extend to the second panel area AA2 via the bending area BA. The power line PL may provide a first voltage to the pixels PX.

The first control line CSL1 may be connected to the scan driver SDV and may extend toward a lower end of the second panel area AA2 via the bending area BA. The second control line CSL2 may be connected to the emission driver EDV and may extend toward a lower end of the second panel area AA2 via the bending area BA.

In a plan view, the pads PD may be disposed adjacent to a lower end of the second panel area AA2. The driving chip DIC, the power line PL, the first control line CSL1, and the second control line CSL2 may be electrically connected to the pads PD. The flexible circuit film FCB may be electrically connected to the pads PD through an anisotropic conductive adhesive layer.

Figure 5A:
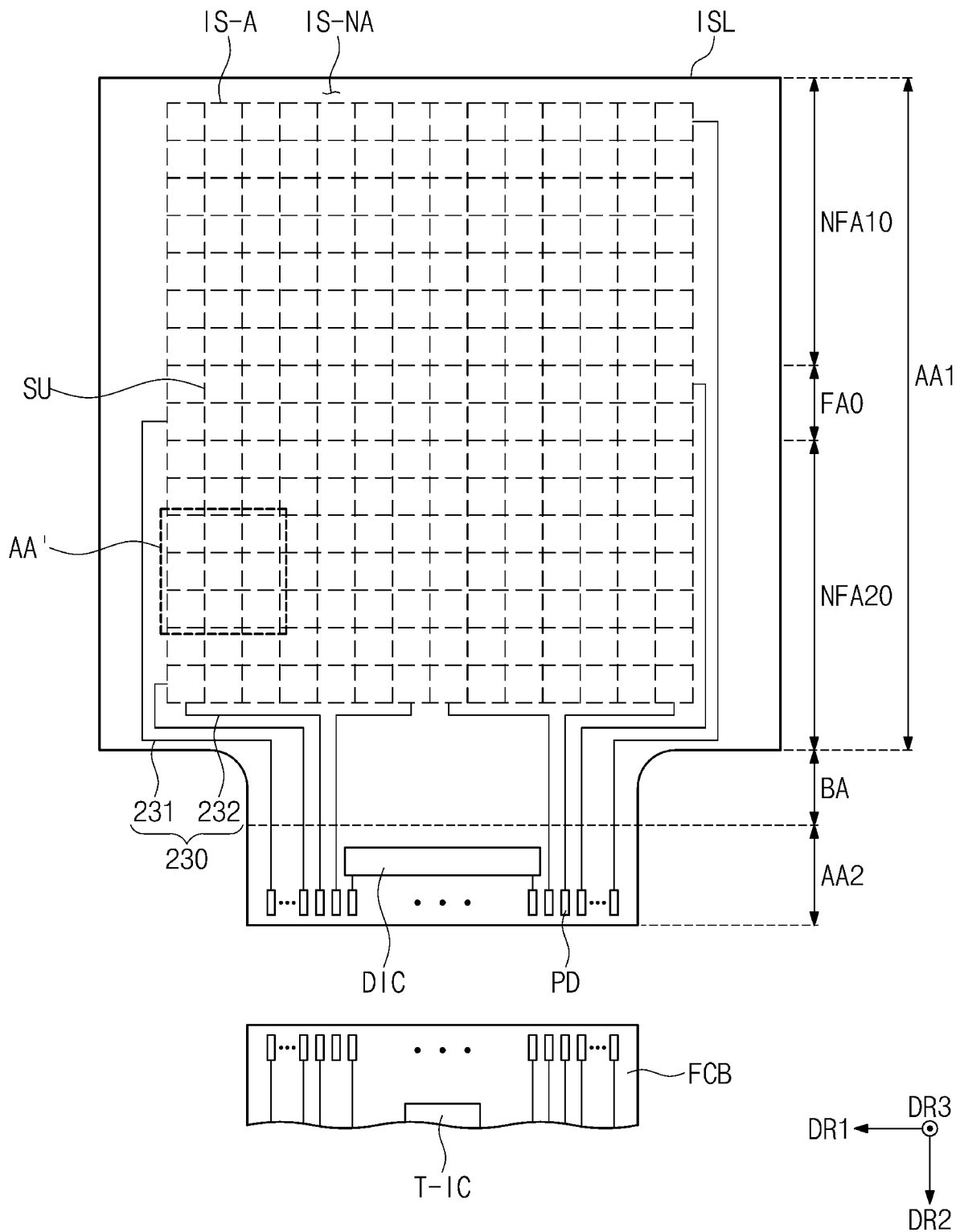
FIG. 5A is a plan view of a sensor layer according to an embodiment of the present disclosure.
Figure 5B:
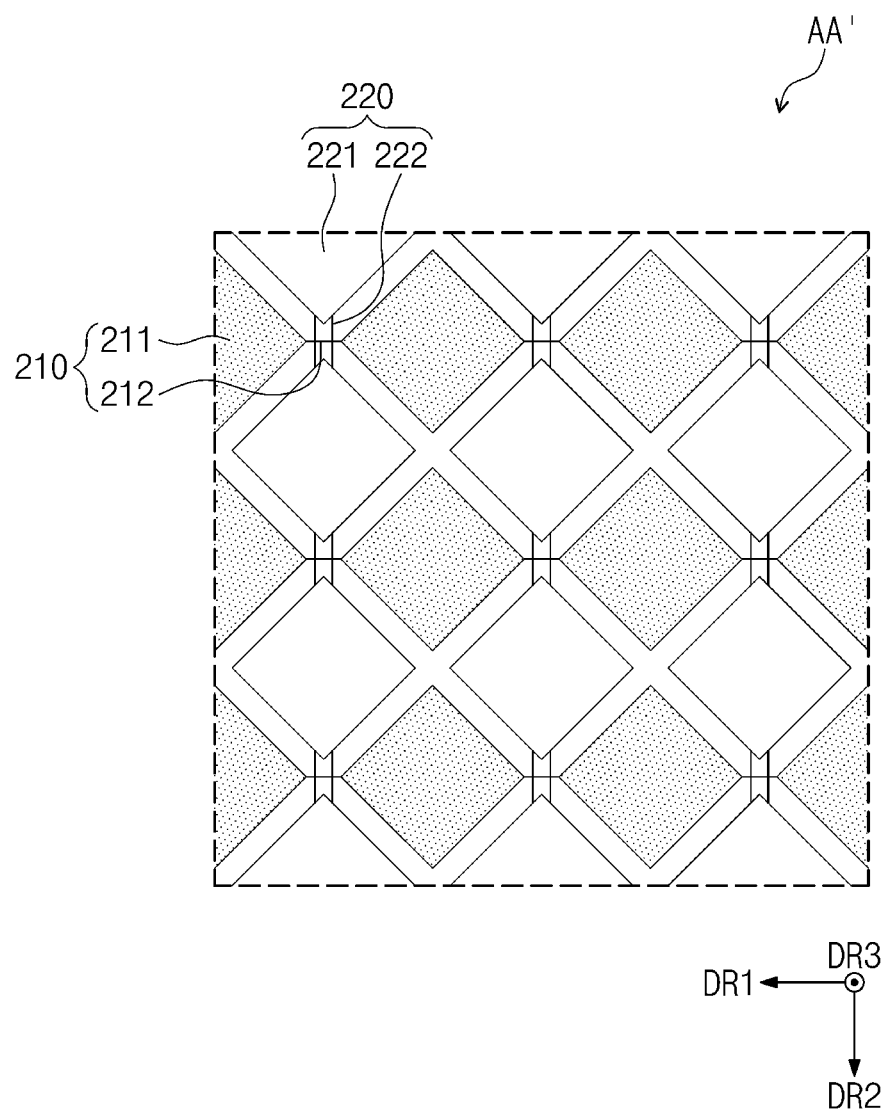
FIG. 5B is an enlarged plan view of area AA' illustrated in FIG. 5A.

FIG. 5A is a plan view of a sensor layer according to an embodiment of the present disclosure. FIG. 5B is an enlarged plan view of area AA' illustrated in FIG. 5A.

Referring to FIGS. 5A and 5B, a sensing area IS-A and a peripheral area IS-NA may be defined in the sensor layer ISL. The sensing area IS-A may be an area activated in response to an electrical signal. For example, the sensing area IS-A may be an area sensing an external input. The peripheral area IS-NA is adjacent to the sensing area IS-A and may at least partially surround the sensing area IS-A.

The sensor layer ISL may include electrodes 210, cross electrodes 220, and sensing lines 230. The electrodes 210 and the cross electrodes 220 may be disposed in the sensing area IS-A, and the sensing lines 230 may be disposed in the peripheral area IS-NA. The sensor layer ISL may acquire information associated with the external input through a change in mutual capacitance between the electrodes 210 and the cross electrodes 220.

The sensor layer ISL may include a plurality of sensing units SU. Each of the plurality of sensing units SU may be defined as an area in which any one electrode of the electrodes 210 and any one cross electrode of the cross electrodes 220 cross each other.

Each of the electrodes 210 may extend along the first direction DR1, and the group of electrodes 210 may be arranged along the second direction DR2. The electrodes 210 may include first portions 211 and second portions 212. The second portions 212 may be adjacent to two neighboring first portions 211.

The cross electrodes 220 may be arranged along the first direction DR1, and each of the cross electrodes 220 may extend along the second direction DR2. The cross electrodes 220 may include patterns 221 and connection patterns 222

(or bridge patterns). The connection patterns 222 may electrically connect two adjacent patterns 221 to each other. The two patterns 221 adjacent to each other may be connected to each other by the two connection patterns 222, but the present disclosure is not necessarily limited thereto. The second portion 212 may insulate and cross the two connection patterns 222.

The patterns 221, the first portions 211, and the second portions 212 may be disposed on the same layer, and the connection patterns 222 may be disposed on a different layer from the patterns 221, the first portions 211, and the second portions 212. For example, the patterns 221, the first portions 211, the second portions 212 may be included in the second conductive layer 204 (e.g., as shown in FIG. 3B), the connection patterns 222 may be included in the first conductive layer 202 (e.g., as shown in FIG. 3B), and this structure may be referred to as a bottom bridge structure. However, the present disclosure is not necessarily limited thereto. For example, the patterns 221, the first portions 211, and the second portions 212 may be included in the first conductive layer 202 (e.g., as shown in FIG. 3B), the connection patterns 222 may be included in the second conductive layer 204 (e.g., as shown in FIG. 3B), and this structure may be referred to as a top bridge structure.

The shape and arrangement relationship of the electrodes 210 and the cross electrodes 220 illustrated in FIG. 5B is only illustrated as an example, and the shape and arrangement relationship of the electrodes 210 and the cross electrodes 220 constituting the sensor layer ISL are not necessarily limited to those illustrated in FIG. 5B.

The sensing lines 230 may be electrically connected to corresponding pads PD. The sensing lines 230 may include lines 231 and crossing lines 232.

The lines 231 may be electrically connected to the electrodes 210, respectively. Some of the lines 231 may be respectively connected to the left side of some of the electrodes 210, and other portions of the lines 231 may be respectively connected to the right side of another portion of the electrodes 210. The crossing lines 232 may be electrically connected to the cross electrodes 220, respectively. However, the connection relationship between the lines 231 and the electrodes 210 and the connection relationship between the crossing lines 232 and the cross electrodes 220 are not necessarily limited to the example illustrated in FIG. 5A.

A touch driving chip T-IC may be electrically connected to the sensor layer ISL to provide a driving signal to the sensor layer ISL and may calculate coordinates from an external input. The touch driving chip T-IC may be mounted on the flexible circuit board (e.g., the FCB shown in FIG. 2). The touch driving chip T-IC may be electrically connected to the lines 231 and the crossing lines 232.

Figure 6:
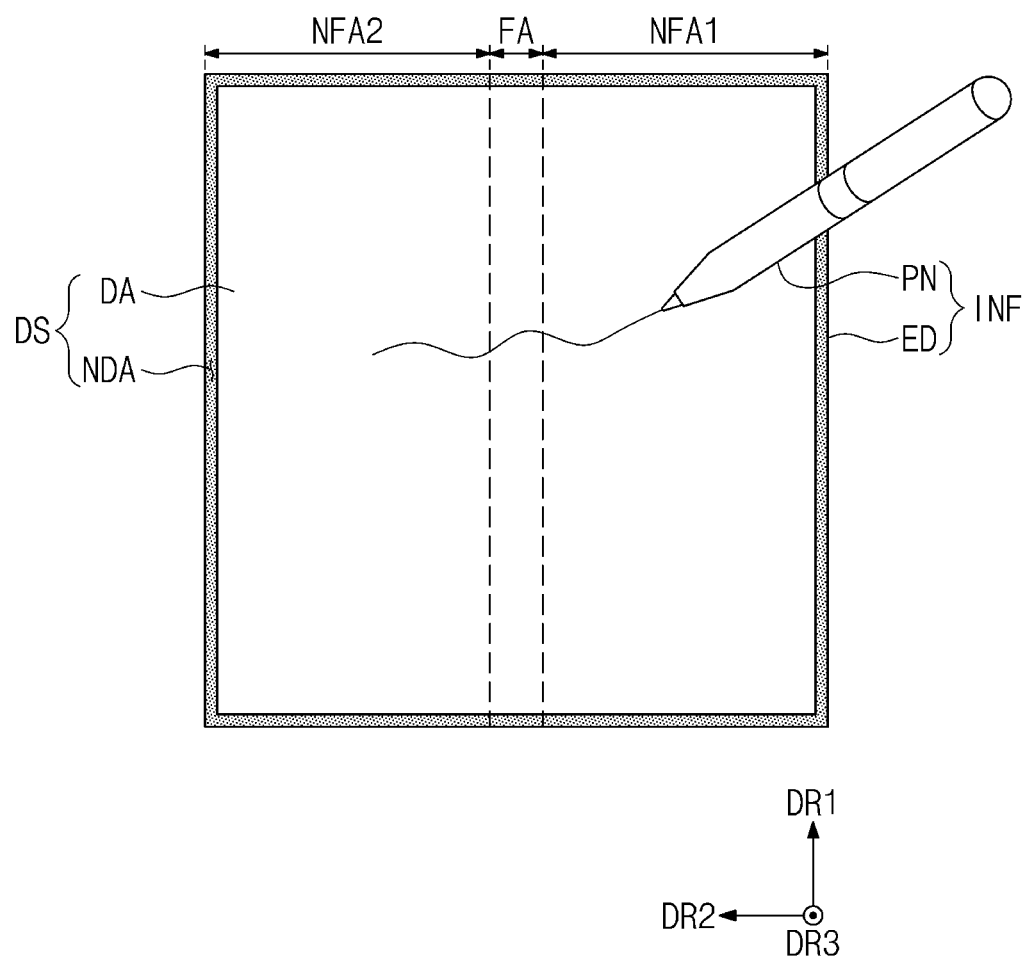
FIG. 6 is a diagram illustrating an interface device according to an embodiment of the present disclosure.

The touch driving chip T-IC may sense the magnetic field or electric field emitted from an input device PN (e.g., as shown in FIG. 6) through the sensor layer ISL and may receive a signal transmitted by the input device PN (e.g., as shown in FIG. 6). In addition, in an embodiment, the touch driving chip T-IC may generate an uplink signal and may provide the uplink signal to the sensor layer ISL. In this case, the electric field is formed in the sensor layer ISL, and the input device PN (e.g., as shown in FIG. 6) may detect a change in the charge amount induced by the electric field to receive the uplink signal.

Figure 5C:
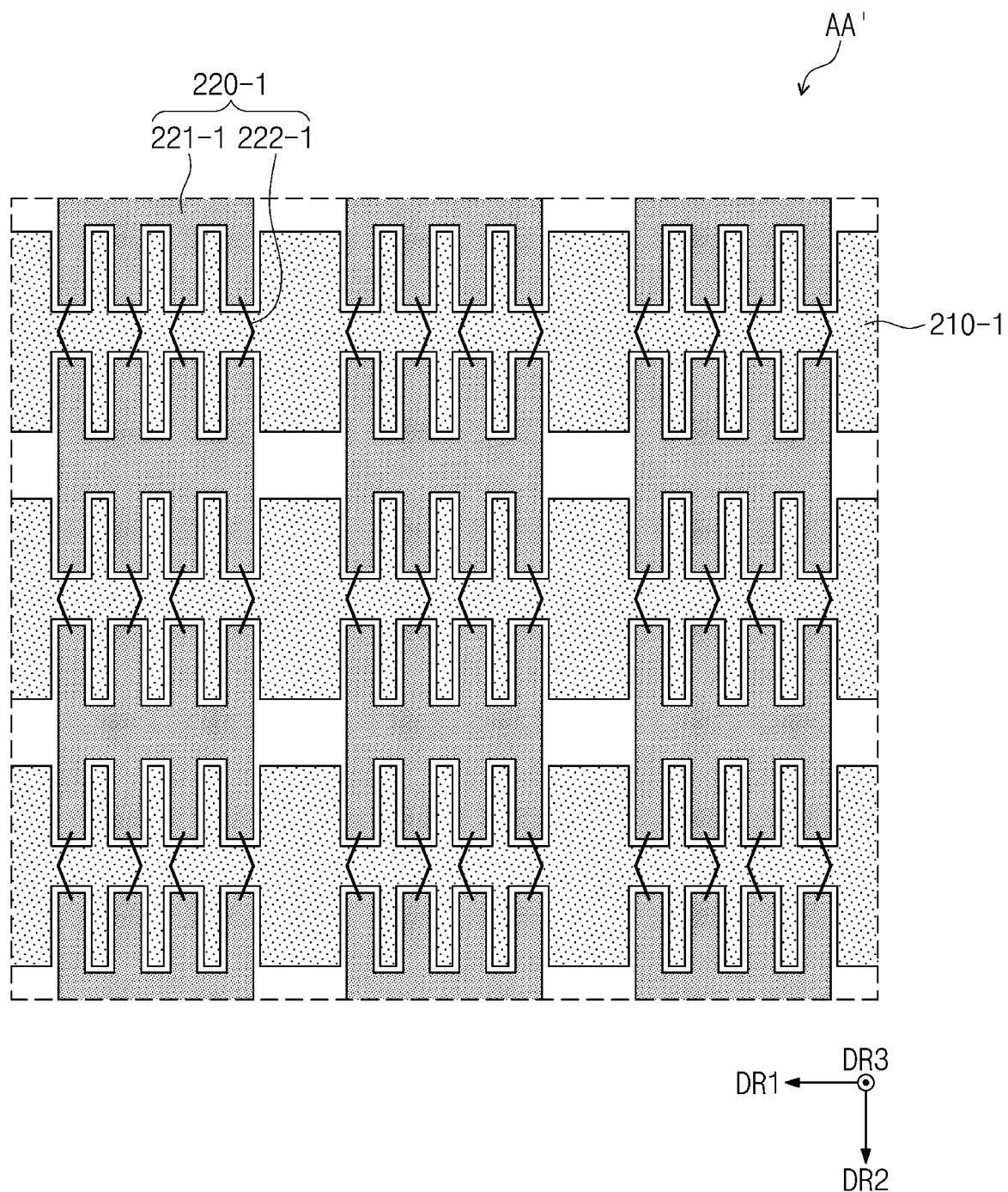
FIG. 5C is an enlarged plan view of area AA' illustrated in FIG. 5A.

FIG. 5C is an enlarged plan view of area AA' illustrated in FIG. 5A.

FIG. 5C illustrates electrodes 210-1 and cross electrodes 220-1 having a shape different from that of FIG. 5B by way of example. The electrodes 210-1 and the cross electrodes 220-1 may have a bar shape.

Each of the electrodes 210-1 may extend along the first direction DR1, and the electrodes 210-1 may be arranged along the second direction DR2. The cross electrodes 220-1 may be arranged along the first direction DR1, and each of the cross electrodes 220-1 may extend along the second direction DR2. The cross electrodes 220-1 may include patterns 221-1 and connection patterns 222-1 (or bridge patterns). The connection patterns 222-1 may electrically connect two adjacent patterns 221-1 to each other. The two patterns 221-1 adjacent to each other may be connected to each other by the four connection patterns 222-1 but the present disclosure is not necessarily limited thereto. One electrode 210-1 may insulate and cross the two connection patterns 222-1. Although it is illustrated that the electrodes 210-1 and the patterns 221-1 have an interlocking shape, the present disclosure is not necessarily limited thereto.

Each of the electrodes 210 or 210-1 and the cross electrodes 220 or 220-1 described with reference to FIGS. 5B and 5C may have a mesh structure. In this case, an opening may be defined in each of the electrodes 210 or 210-1 and the cross electrodes 220 or 220-1. However, the present disclosure is not necessarily limited thereto, and each of the electrodes 210 or 210-1 and the cross electrodes 220 or 220-1 may be a transparent electrode in which an opening is not defined.

FIG. 6 is a diagram illustrating an interface device according to an embodiment of the present disclosure.

Referring to FIG. 6, an interface device INF may include the electronic device ED and the input device PN. The interface device INF may be referred to as an electronic system, a touch system, an input/output system, a digitizer system, a pen/stylus tablet, or a pen/stylus terminal.

The input device PN may transmit and receive the signal. The signal may be transmitted and received as a magnetic field (B-field) or an electric field (E-field). For example, after determining the type of signal to be transmitted, the controller of the input device PN may transmit the signal as the magnetic field or the electric field, based on the determination. The input device PN may be referred to as an electronic pen, a stylus (e.g., an active stylus), or a composite pen. Hereinafter, a signal transmitted as the magnetic field (B-field) is referred to as a magnetic field signal, and a signal transmitted as the electric field (E-filed) is referred to as an electric field signal.

The controller of the input device PN may include a signal generator that generates AC power. In this case, the input device PN may generate an induced current by its internal configuration even if there is no external magnetic field provided from an external source. Accordingly, even if the electronic device ED does not include a digitizer that generates the magnetic field, the electronic device ED may sense an input of the input device PN that outputs the magnetic field.

Also, the input device PN and the electronic device ED may perform bidirectional communication according to a predetermined protocol. The electronic device ED may transmit the uplink signal to the input device PN, and the input device PN may transmit the downlink signal to the electronic device ED. The predetermined protocol may be an active pen protocol, for example, a universal stylus initiative (USI), an active electrostatic protocol (AES), or a MICROSOFT pen protocol (MPP) maintained by the Microsoft Corporation, but is not necessarily limited thereto.

For example, the input device PN may output at least a portion of the downlink signal as the magnetic field. The downlink signal may include a position signal and a data signal. In an embodiment, the input device PN may transmit the position signal to the electronic device ED through the magnetic field and may transmit the data signal to the electronic device ED through the electric field. In this case, the electronic device ED may sense the magnetic field emitted from the input device PN, may detect a position coordinate of the input device PN, may detect a change in the charge amount due to the electric field, and may receive the data signal transmitted from the input device PN. In an embodiment, the input device PN may transmit the position signal and the data signal to the electronic device ED through the magnetic field. In this case, the electronic device ED may sense the magnetic field emitted from the input device PN, may detect the position coordinate of the input device PN, and may receive the data signal transmitted from the input device PN.

Figure 7A:
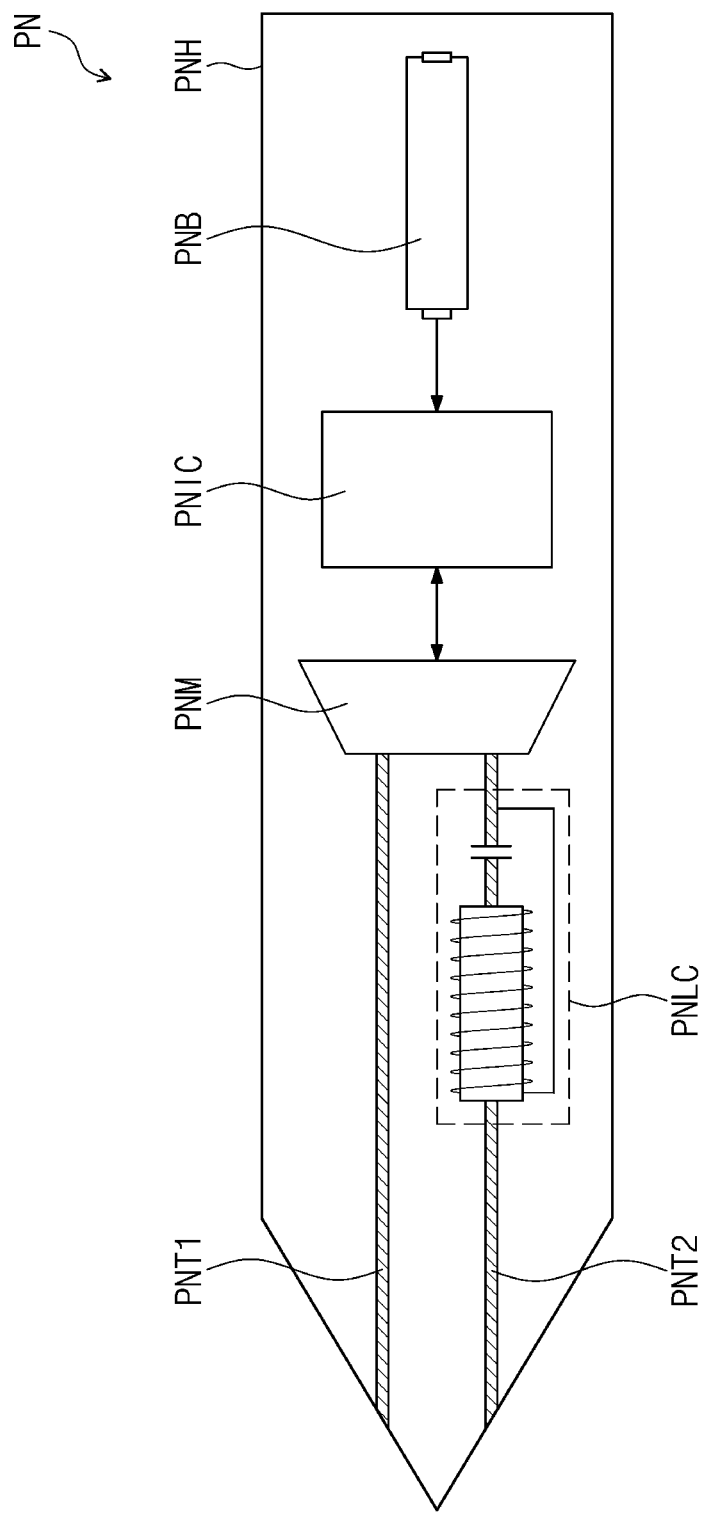
FIG. 7A is a block diagram of an input device according to an embodiment of the present disclosure.

FIG. 7A is a block diagram of an input device according to an embodiment of the present disclosure.

Referring to FIG. 7A, the input device PN may include a housing PNH, a power supply PNB, a controller PNIC, a multiplexer PNM, a resonance circuit PNLC, a first pen/stylus tip PNT1, and a second pen/stylus tip PNT2.

The housing PNH may have a pen shape, and an accommodation space may be formed therein. The power supply PNB, the controller PNIC, the multiplexer PNM, and the resonance circuit PNLC may be accommodated in the accommodation space defined inside the housing PNH.

The power supply PNB may supply power to the controller PNIC. The power supply PNB may include a battery or a high capacity capacitor.

The controller PNIC may include, but is not necessarily limited to including, a controller for controlling operations of components in the input device PN, a communication module having a signal generator and a signal receiver, and a switch. For example, the controller PNIC may further include components for an operation of the input device PN.

The controller PNIC may generate a signal (e.g., a Tx signal) and may control the operation of the input device PN. In addition, the controller PNIC may determine a type of the signal. For example, the controller PNIC may determine whether a reception signal or a signal to be transmitted is the magnetic field signal or the electric field signal. The controller PNIC may allow the multiplexer PNM to transmit or receive the magnetic field signal or the electric field signal, based on the determined signal type. The controller PNIC may be an integrated circuit.

The multiplexer PNM may be provided between the controller PNIC and the first pen/stylus tip PNT1, and between the controller PNIC and the resonance circuit PNLC. When the reception signal or the transmission signal is the electric field signal, the multiplexer PNM may transfer a signal input through the first pen/stylus tip PNT1 to the controller PNIC or may transfer a signal provided from the controller PNIC to the first pen/stylus tip PNT1.

When the reception signal or the transmission signal is the magnetic field signal, the multiplexer PNM may transfer a signal induced in the resonance circuit PNLC to the controller PNIC or may transfer a signal provided from the controller PNIC to the resonance circuit PNLC. The resonance circuit PNLC may be charged by a signal provided from the controller PNIC. For example, the controller PNIC may output an AC signal having a frequency with a predetermined value. For example, the signal may be a sinusoidal waveform of about 1.8 MHz, but the present disclosure is not necessarily limited thereto. An induced current may be generated in the resonance circuit PNLC by the signal, and the resonance circuit PNLC may resonate by the induced current to emit the magnetic field.

The first pen/stylus tip PNT1 and the second pen/stylus tip PNT2 may be disposed at an end of the housing PNH. The first pen/stylus tip PNT1 may be connected to the multiplexer PNM, and the second pen/stylus tip PNT2 may be connected to the resonance circuit PNLC. The electric field signal may be output or input through the first pen/stylus tip PNT1, and the magnetic field signal may be output or input through the second pen/stylus tip PNT2 and the resonance circuit PNLC. The first and second pen/stylus tips PNT1 and PNT2 may be referred to as first and second electrodes PNT1 and PNT2, or first and second conductors PNT1 and PNT2.

The input device PN may transmit the downlink signal according to a predetermined protocol as well as transmit the magnetic field signal. For example, the input device PN may output at least a portion of the downlink signal according to the active pen protocol as the magnetic field signal. The magnetic field signal has a higher signal-to-noise ratio than the electric field signal. Accordingly, the input device PN may be made more accurate, for example, by increasing signal transfer.

In addition, since the input device PN transmits and receives the magnetic field signal and the electric field signal, the input device PN is compatible with various devices. For example, the input device PN may be compatible with an electronic device that does not include the digitizer and does not provide the uplink signal, an electronic device that provides the uplink signal, and an electronic device that includes the digitizer.

Figure 7B:
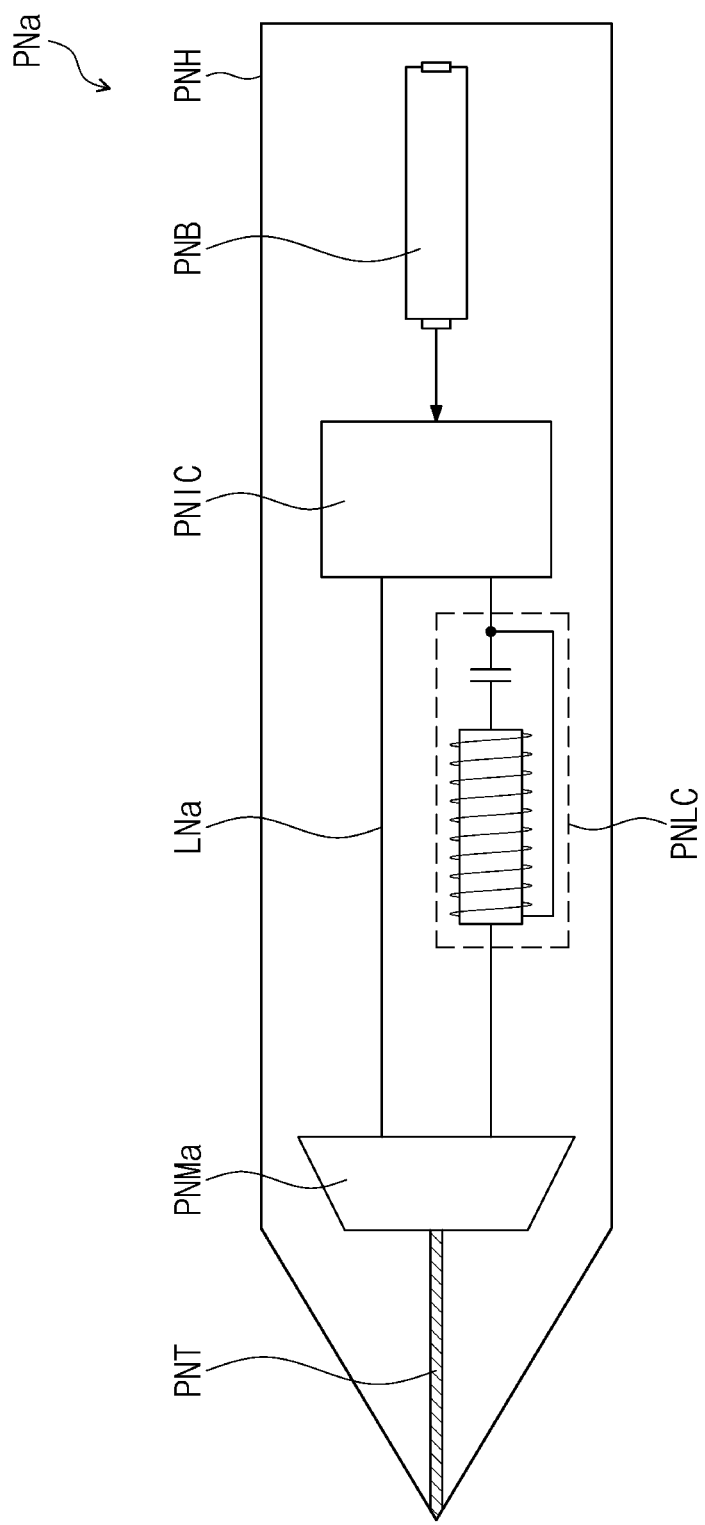
FIG. 7B is a block diagram of an input device according to an embodiment of the present disclosure.

FIG. 7B is a block diagram of an input device according to an embodiment of the present disclosure.

Referring to FIG. 7B, an input device PNa may include the housing PNH, the power supply PNB, the controller PNIC, a multiplexer PNMa, the resonance circuit PNLC, a conductor LNa, and a pen/stylus tip PNT.

The multiplexer PNMa may be provided between the pen/stylus tip PNT and the conductor LNa and between the pen/stylus tip PNT and the resonance circuit PNLC. When the transmission signal or the reception signal is the magnetic field signal, the multiplexer PNMa may transfer a signal input through the pen/stylus tip PNT to the resonance circuit PNLC.

The input device PNa may transmit the downlink signal according to a predetermined protocol as well as transmit a magnetic field signal. For example, the input device PNa may output at least a portion of the downlink signal according to the active pen protocol as the magnetic field signal. The magnetic field signal has a higher signal-to-noise ratio than the electric field signal. Accordingly, the input device PNa may be made more accurate, for example, by increasing signal transfer.

In addition since the input device PNa transmits and receives the magnetic field signal and the electric field signal, the input device PNa is compatible with various devices. For example, the input device PNa may be compatible with an electronic device that does not include the digitizer and does not provide the uplink signal, an electronic device that provides the uplink signal, and an electronic device that includes the digitizer.

Figure 8A:
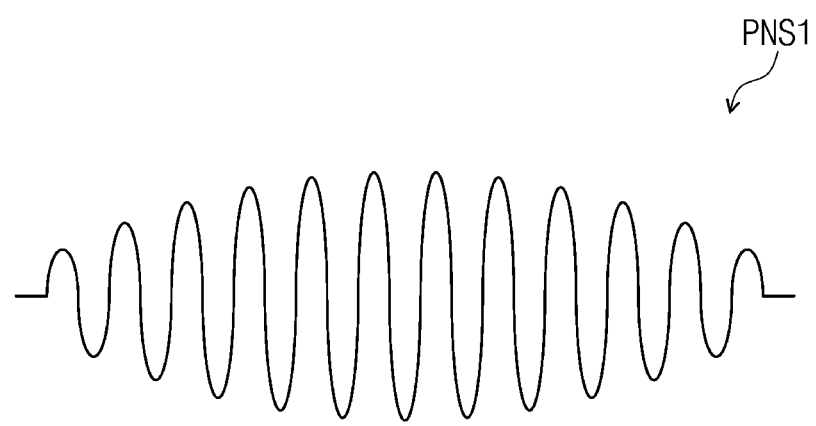
FIG. 8A is a signal diagram of a first type signal provided from an input device according to an embodiment of the present disclosure.
Figure 8B:
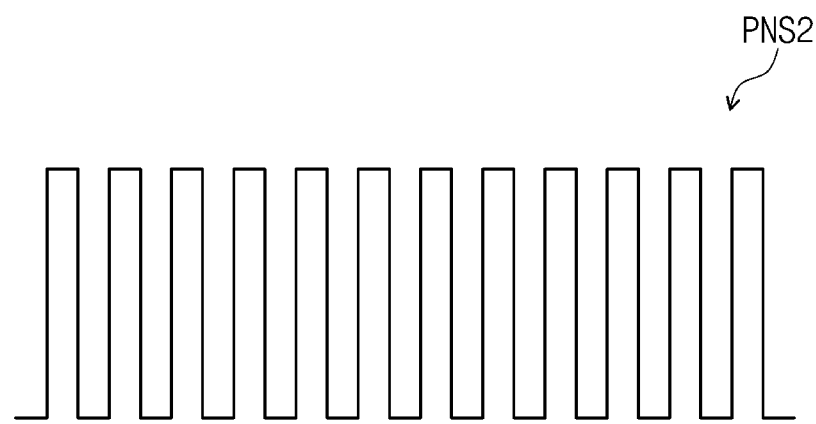
FIG. 8B is a signal diagram of a second type signal provided from an input device according to an embodiment of the present disclosure.

FIG. 8A illustrates a first type signal PNS1 provided by an input device according to an embodiment of the present disclosure. FIG. 8B illustrates a second type signal PNS2 provided by an input device according to an embodiment of the present disclosure.

The input device PN or PNa (e.g., as shown in FIG. 7A or 7B) may selectively output the first type signal PNS1 and/or the second type signal PNS2. A waveform of the first type signal PNS1 and a waveform of the second type signal PNS2 may be different from each other. The first type signal PNS1 may have a waveform having an amplitude that varies over time, and the second type signal PNS2 may have a waveform having a uniform amplitude.

The first type signal PNS1 may be a resonance signal, and the second type signal PNS2 may be a signal having a specific waveform. Although a square wave is illustrated as an example of the second type signal PNS2 in FIG. 8B, the present disclosure is not necessarily limited thereto. For example, the second type signal PNS2 may have a sinusoidal waveform or a trapezoidal waveform.

When the first type signal PNS1 is transmitted from the input device PN or PNa (e.g., as shown in FIG. 7A or FIG. 7B), the electronic device ED (e.g., as shown in FIG. 6) may sense the magnetic field and may receive a signal provided from the input device PN or PNa (e.g., as shown in FIG. 7A or FIG. 7B).

When the second type signal PNS2 is transmitted from the input device PN or PNa (e.g., as shown in FIG. 7A or FIG. 7B), the electronic device ED (e.g., as shown in FIG. 6) may detect a change in the charge amount due to the electric field, and may receive a signal provided from the input device PN or PNa (e.g., as shown in FIG. 7A or FIG. 7B).

Figure 9:
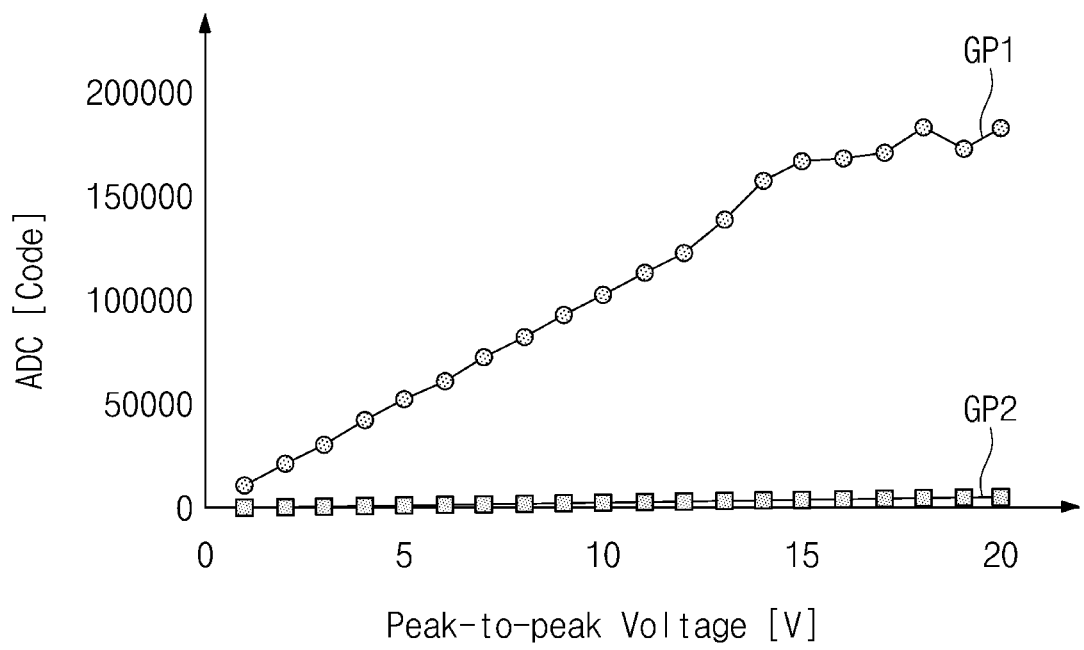
FIG. 9 is a graph illustrating ADC codes according to peak-to-peak voltages of a first type signal and a second type signal, respectively.

FIG. 9 is a graph illustrating ADC codes according to peak-to-peak voltages of the first type signal and the second type signal, respectively.

Referring to FIGS. 8A, 8B, and 9, a first graph GP1 indicates an ADC code according to the peak-to-peak voltage of the first type signal PNS1, and a second graph GP2 indicates an ADC code according to the peak-to-peak voltage of the second type signal PNS2.

When the peak-to-peak value is 17 V, the ADC code of the first type signal PNS1 may be 4328, and the ADC code of the second type signal PNS2 may be 173,417. Their difference may be close to 40 times. Accordingly, the signal-to-noise ratio of the first type signal PNS1 may be greater than the signal-to-noise ratio of the second type signal PNS2. Accordingly, a coordinate detection accuracy based on the first type signal PNS1 may be greater than a coordinate detection accuracy based on the second type signal PNS2.

The input device PN or PNa (e.g., as shown in FIG. 7A or FIG. 7B) according to the present disclosure may provide at least a portion of signals according to a predetermined protocol as the first type signal PNS1. Accordingly, the electronic device ED (e.g., as shown in FIG. 6) may calculate the coordinate of the input device PN or PNa (e.g., as shown in FIG. 7A or FIG. 7B) based on the first type signal PNS1. As a result, coordinate detection may be made more accurate.

Figure 10:
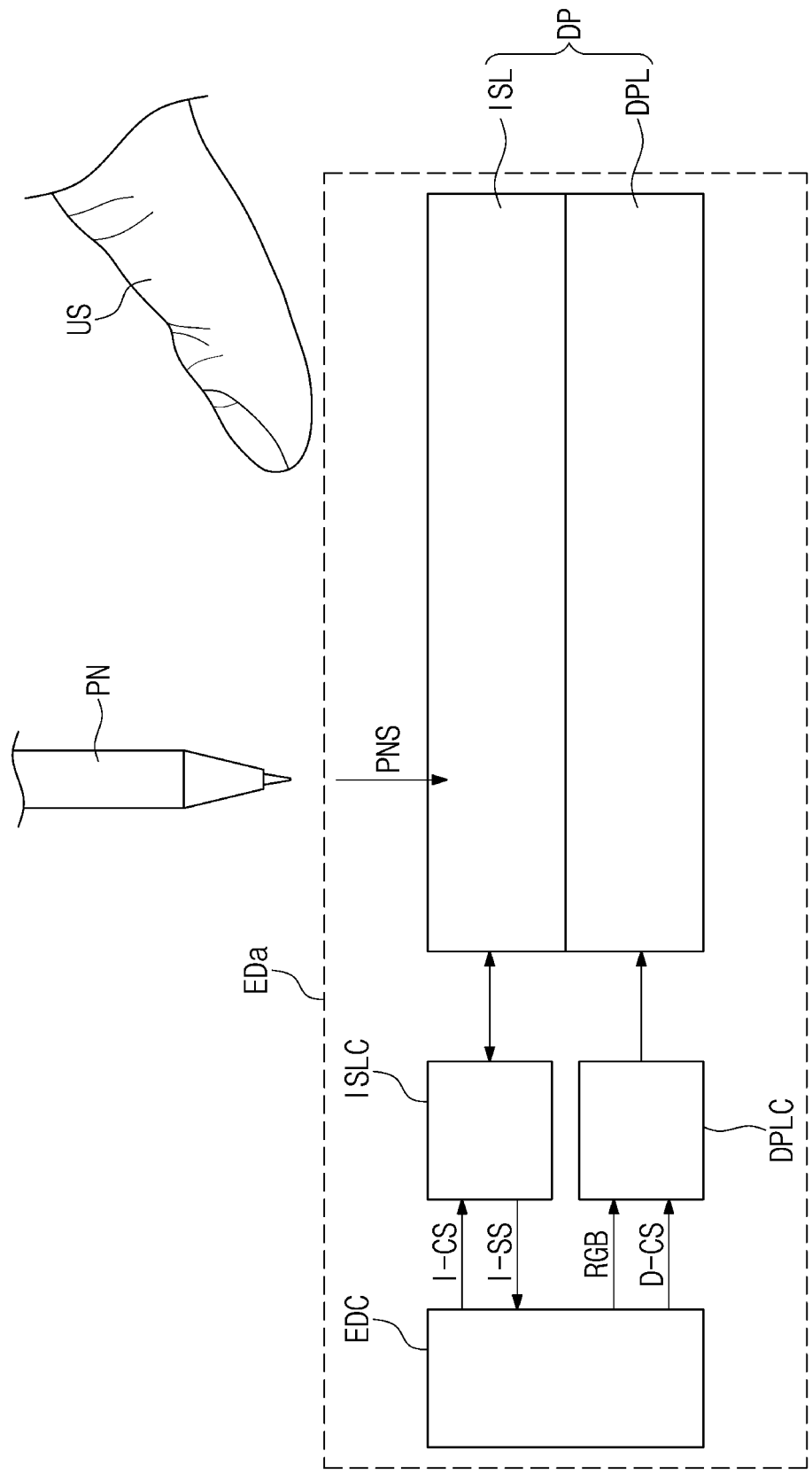
FIG. 10 is a diagram illustrating an operation between an electronic device and an input device according to an embodiment of the present disclosure.

FIG. 10 is a diagram describing an operation between an electronic device and an input device according to an embodiment of the present disclosure.

Referring to FIG. 10, an electronic device EDa may include the display panel DP, a display driver DPLC, a sensor driver ISLC, and a main driver EDC.

The main driver EDC may control the overall operation of the electronic device EDa. For example, the main driver EDC may control operations of the display driver DPLC and the sensor driver ISLC. The main driver EDC may include at least one microprocessor, and the main driver EDC may be referred to as a host.

The display driver DPLC may drive the display layer DPL. The display driver DPLC may include the scan driver SDV (e.g., as shown in FIG. 4), a data driver included in the driving chip DIC, and the emission driver EDV (e.g., as shown in FIG. 4). The main driver EDC may further include a graphic controller. The display driver DPLC may receive image data RGB and a control signal D-CS from the main driver EDC. The control signal D-CS may include various signals. For example, the control signal D-CS may include an input vertical synchronization signal, an input horizontal synchronization signal, a main clock, a data enable signal, etc. The display driver DPLC may generate a vertical synchronization signal and a horizontal synchronization signal for controlling the timing of providing a signal to the display layer DPL, based on the control signal D-CS.

The sensor driver ISLC may drive the sensor layer ISL. The sensor driver ISLC may be included in the touch driving chip T-IC (e.g., as shown in FIG. 4). The sensor driver ISLC may receive a control signal I-CS from the main driver EDC. The sensor driver ISLC may calculate input coordinate information based on a signal received from the sensor layer ISL, and may provide a coordinate signal I-SS having the coordinate information to the main driver EDC.

The main driver EDC executes an operation corresponding to a user input, based on the coordinate signal I-SS. For example, the main driver EDC may allow the display driver DPLC to display a new application image on the display layer DPL.

The electronic device EDa may sense both a first input by the input device PN and a second input by a touch US. The input device PN may be one of the input devices PN and PNa described above with reference to FIGS. 7A and 7B. The input device PN may transmit the downlink signal according to a predetermined protocol as well as transmit the magnetic field signal. The touch US may include all input means capable of providing a change in capacitance, such as a user's body (e.g., a finger) or a passive pen/stylus.

The electronic device EDa might not provide the uplink signal. In this case, a signal PNS provided from the input device PN may be the magnetic field signal. The electronic device EDa may calculate the input coordinate, based on the magnetic field signal through the sensor layer ISL.

Unlike what is shown in FIG. 10, the electronic device EDa may further include a digitizer. The digitizer may be disposed under the display layer DPL, embedded in the display layer DPL, embedded in the sensor layer ISL, or disposed between the display layer DPL and the sensor layer ISL. In this case, the input device PN may operate as a passive input device.

Figure 11:
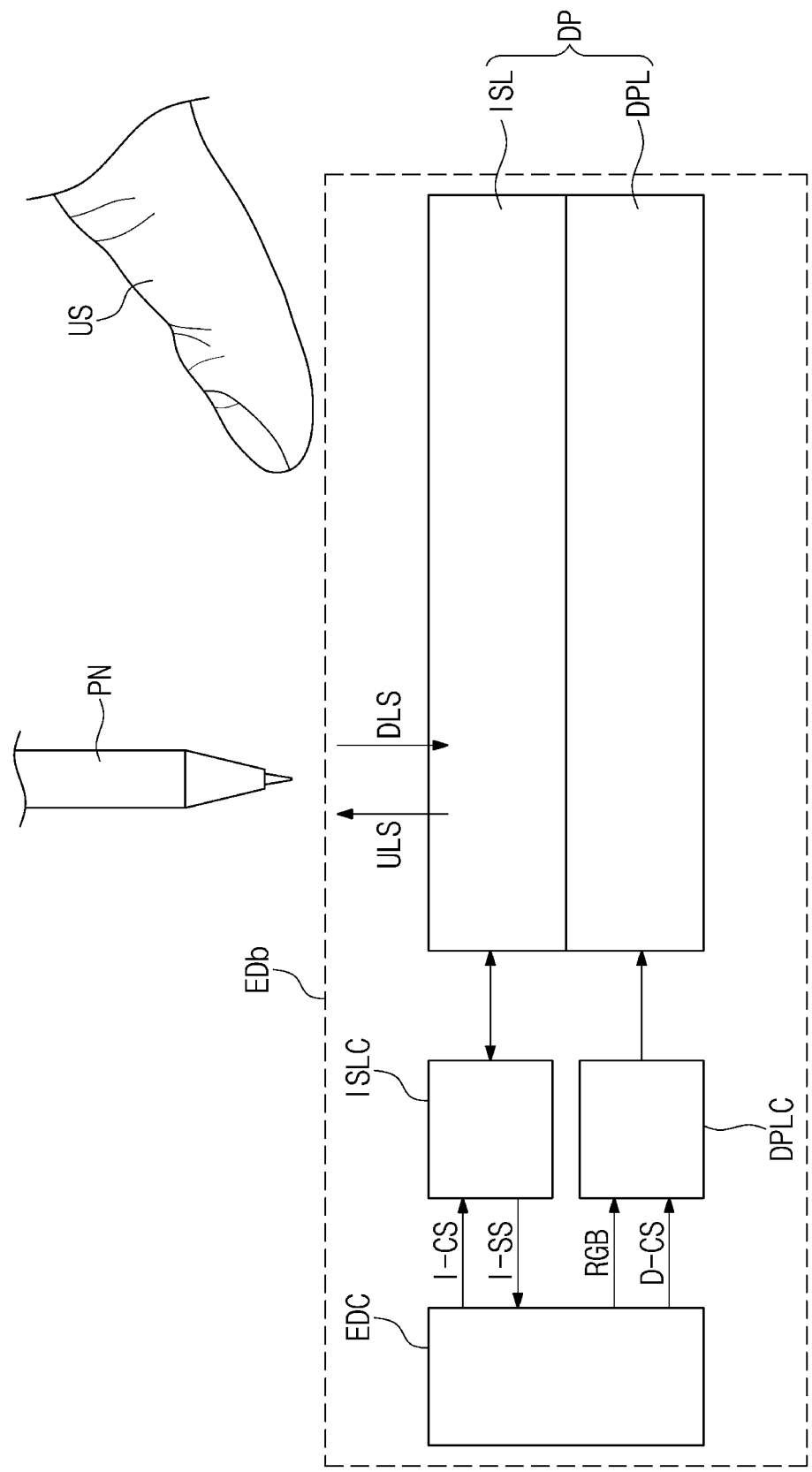
FIG. 11 is a diagram illustrating an operation between an electronic device and an input device according to an embodiment of the present disclosure.

FIG. 11 is a diagram describing an operation between an electronic device and an input device according to an embodiment of the present disclosure.

Referring to FIG. 11, an electronic device EDb and the input device PN may bi-directionally communicate with each other. The electronic device EDb may provide an uplink signal ULS to the input device PN, and the input device PN may provide a downlink signal DLS to the electronic device EDb. For example, the uplink signal ULS may include information such as panel information and protocol version, but the present disclosure is not necessarily limited thereto. The downlink signal DLS may include a synchronization signal or state information of the input device PN. For example, the state information of the input device PN may include coordinate information of the input device PN, battery information of the input device PN, tilt information of the input device PN, and/or a variety of information stored in the input device PN, but the present disclosure is not necessarily limited thereto.

The input device PN may output at least a portion of the downlink signal DLS according to the active pen protocol as the magnetic field signal. The magnetic field signal has a higher signal-to-noise ratio than the electric field signal. Accordingly, the input device PN may be made more accurate, for example, by increasing signal transfer. For example, when at least a portion of the downlink signal DLS is provided as the magnetic field signal, coordinate detection may be made more accurate.

Figure 12:
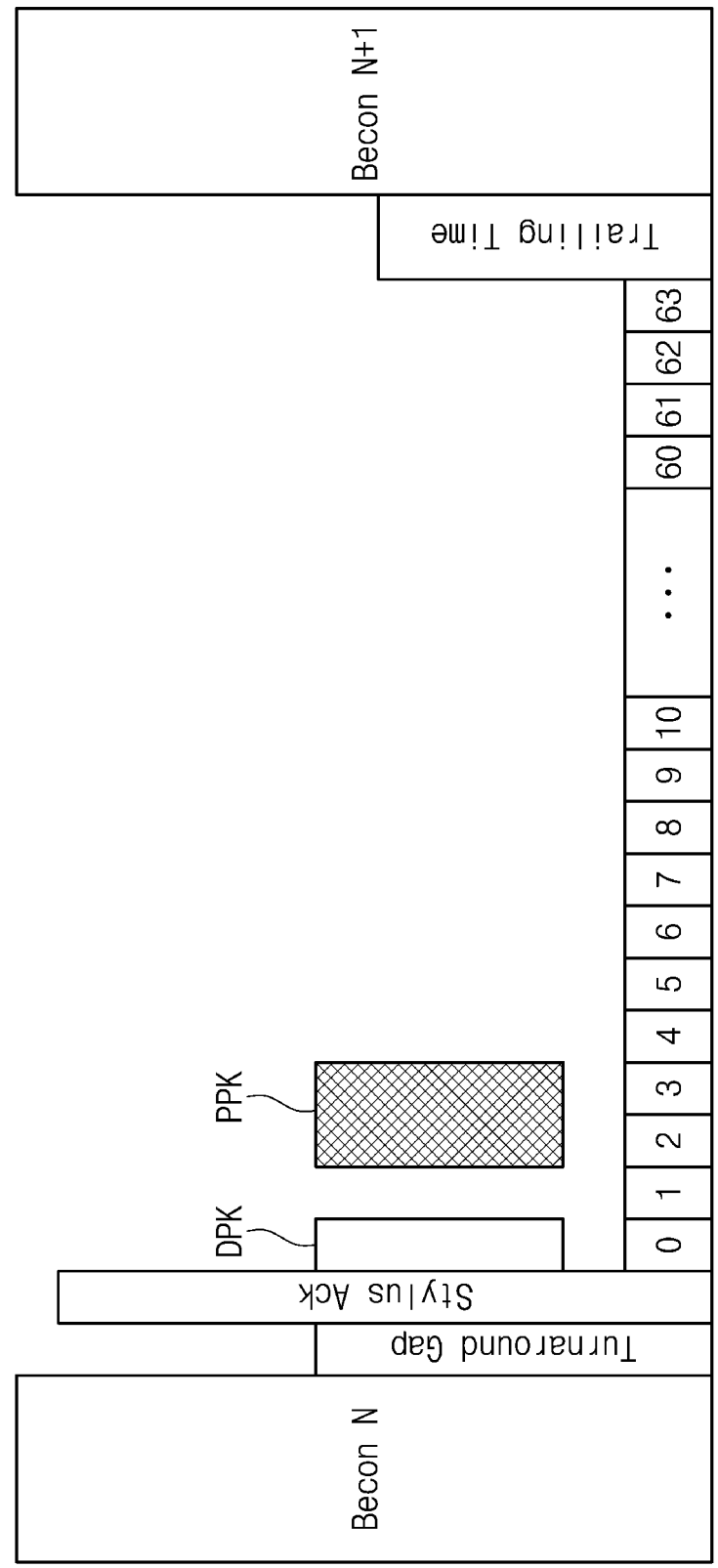
FIG. 12 is a diagram illustrating a packet structure of a protocol according to an embodiment of the present disclosure.

FIG. 12 is a diagram illustrating a packet structure of a protocol according to an embodiment of the present disclosure. FIG. 12 illustrates a packet structure of a Universal Stylus Initiative (USI) protocol.

Referring to FIGS. 7A, 11, and 12, the uplink signal ULS may be provided through the sensor layer ISL. For example, the electric field may be generated on the sensor layer ISL, and the input device PN may receive the uplink signal ULS by detecting a change in the charge amount induced by the electric field. Thereafter, the input device PN may transmit the downlink signal DLS. The downlink signal DLS may include a data packet DPK and a position packet PPK.

According to an embodiment of the present disclosure, the position packet PPK for detecting the position of the input device PN is provided based on the first type signal PNS1 (e.g., as shown in FIG. 8A), and the data packet DPK having information associated with the input device PN may be provided based on the second type signal PNS2 (e.g., as show in FIG. 8B). The sensor layer ISL may sense the magnetic field emitted from the resonance circuit PNLC of the input device PN to detect the position coordinate of the input device PN. In addition, the sensor layer ISL may receive the data packet DPK transmitted from the input device PN by detecting a change in the charge amount caused by the electric field emitted from the input device PN. The signal-to-noise ratio of the first type signal PNS1 may be greater than the signal-to-noise ratio of the second type signal PNS2. Therefore, when the position packet PPK is provided using the first type signal PNS1, coordinate detection of the electronic device EDb may be made more accurate than the coordinate detection of the electronic device EDb when the position packet PPK is provided using the second type signal PNS2.

According to an embodiment of the present disclosure, the input device PN may transmit both the position packet PPK and the data packet DPK using the first type signal PNS1 (e.g., as shown in FIG. 8A). In this case, the sensor layer ISL may sense the magnetic field emitted from the resonance circuit PNLC of the input device PN and then may receive the position packet PPK and the data packet DPK transmitted by the input device PN.

Figure 13:
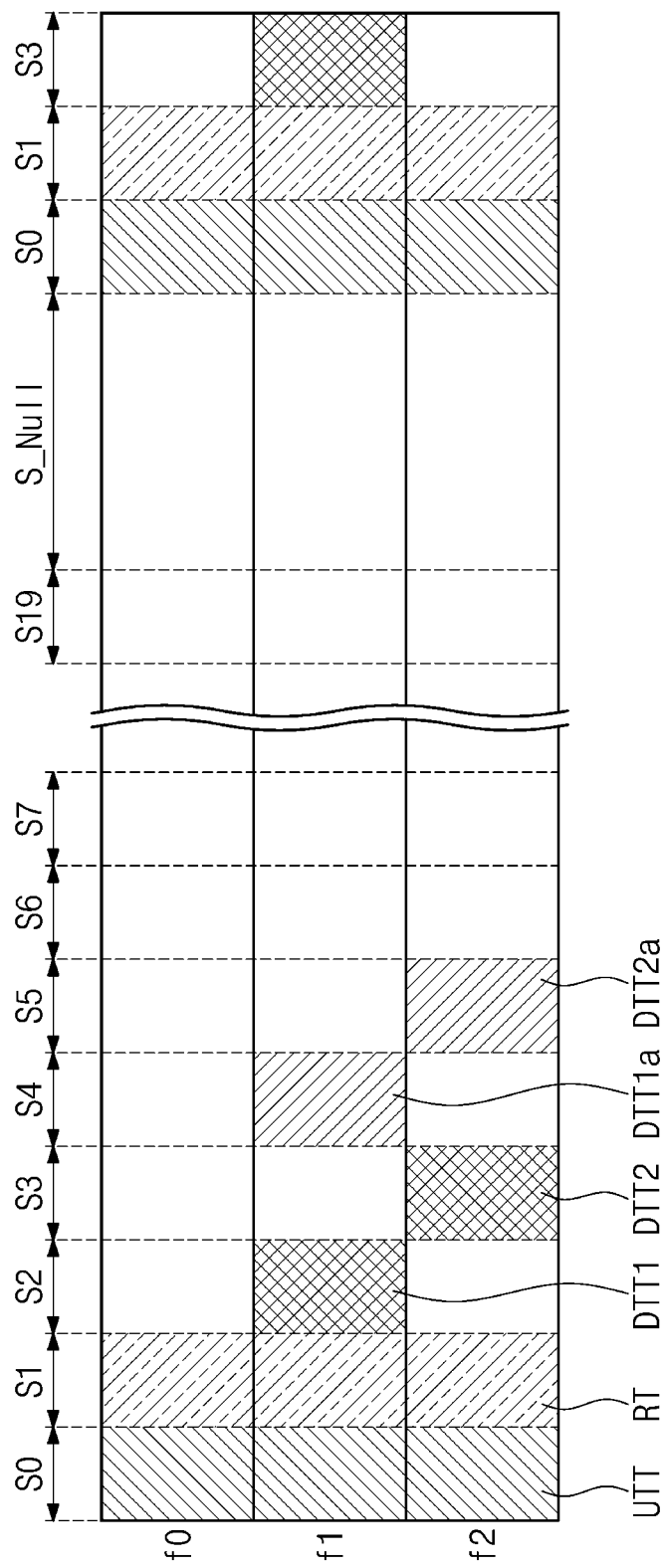
FIG. 13 is a diagram illustrating a packet structure of a protocol according to an embodiment of the present disclosure.

FIG. 13 is a diagram illustrating a packet structure of a protocol according to an embodiment of the present disclosure. FIG. 13 illustrates a packet structure of an active electrostatic protocol (AES).

Referring to FIGS. 7A, 11, and 13, the uplink signal ULS may be provided through the sensor layer ISL during a transmission timing UTT assigned to a first time slot S0. For example, the input device PN may receive the uplink signal ULS by detecting a change in the charge amount induced by the electric field formed on the sensor layer ISL. After a response timing RT for responding to the uplink signal ULS, the input device PN may output the downlink signal DLS at the transmission timings DTT1, DTT2, DTT1a, and DTT2a.

According to an embodiment of the present disclosure, a burst signal for detecting the position of the input device PN among the downlink signal DLS, for example, signals provided at the first and second transmission timings DTT1 and DTT2 may be provided as the first type signal PNS1 (e.g., as shown in FIG. 8A). Thereafter, the signals provided at the transmission timings DTT1a and DTT2a may be provided as the second type signal PNS2 (e.g., as shown in FIG. 8B). The sensor layer ISL may detect the position coordinate of the input device PN by detecting the magnetic field emitted from the resonance circuit PNLC of the input device PN. In addition, the sensor layer ISL may detect a change in the charge amount caused by the electric field emitted from the input device PN, and then may receive data transmitted from the input device PN.

According to an embodiment of the present disclosure, all of the downlink signals DLS may be provided as the first type signal PNS1 (e.g., as shown in FIG. 8A). In this case, the sensor layer ISL may sense the magnetic field emitted from the resonance circuit PNLC of the input device PN, and then may receive the position signal and the data signal transmitted from the input device PN.

Figure 14:
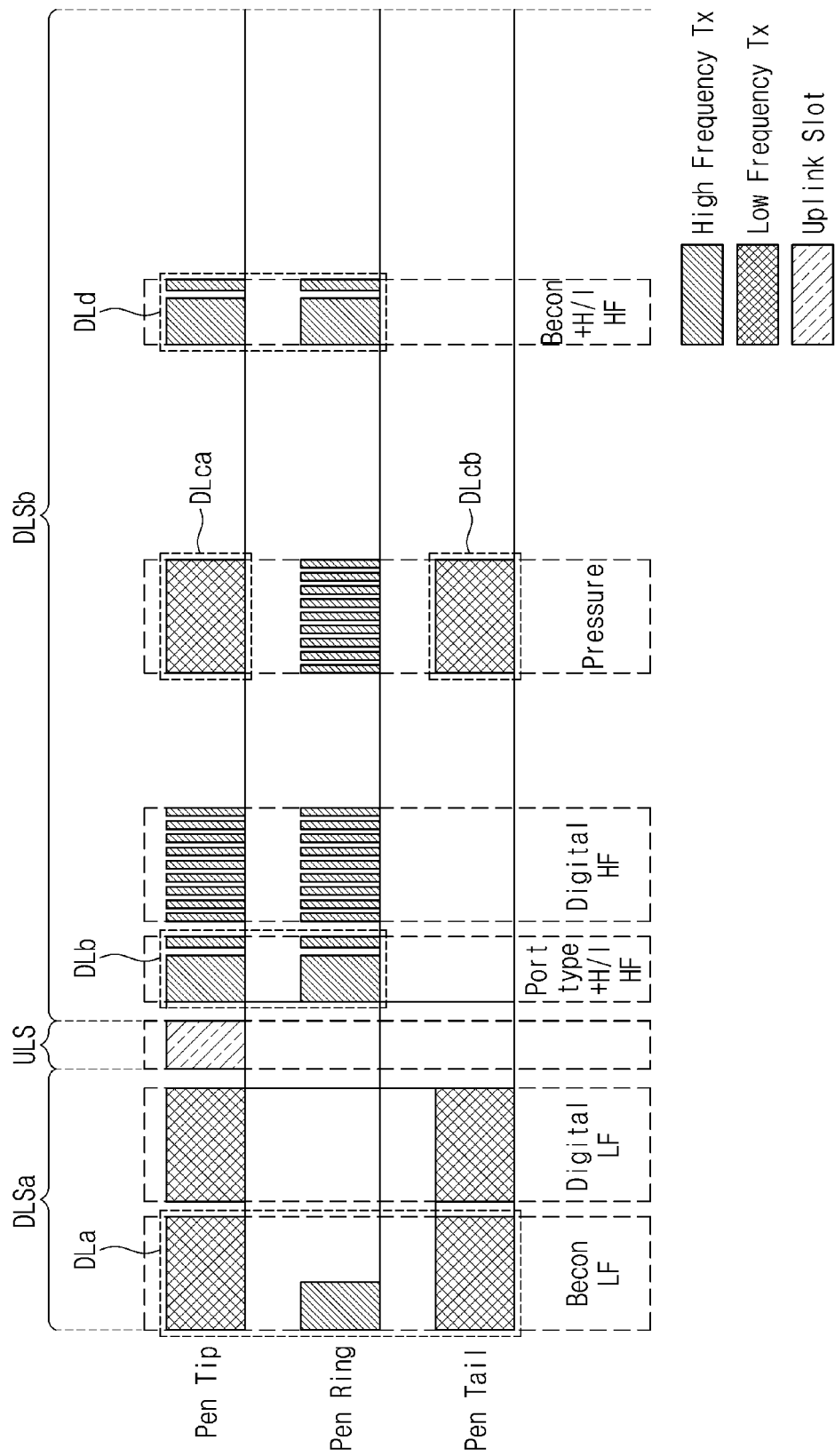
FIG. 14 is a diagram illustrating a packet structure of a protocol according to an embodiment of the present disclosure.

FIG. 14 is a diagram illustrating a packet structure of a protocol according to an embodiment of the present disclosure. FIG. 14 illustrates a packet structure of the MICROSOFT pen protocol (MPP).

Referring to FIGS. 7A, 11, and 14, a first downlink signal DLSa is transmitted from a pen/stylus tip, a pen/stylus ring, and a pen/stylus tail of the input device PN. Thereafter, the input device PN receives the uplink signal ULS provided from the sensor layer ISL. For example, the input device PN may receive the uplink signal ULS by detecting a change in the charge amount induced by the electric field formed on the sensor layer ISL. Thereafter, a second downlink signal DLSb is transmitted from the pen/stylus tip, the pen/stylus ring, and the pen/stylus tail of the input device PN.

The first downlink signal DLSa and the second downlink signal DLSb may include data associated with the position, the pressure, and other functions of the input device PN. For example, all of first partial downlink signals DLa of the first downlink signals DLSa, and second partial downlink signals DLb, a third partial downlink signal DLca, a fourth partial downlink signal DLcb, and a fifth partial downlink signal DLd of the second downlink signals DLSb are provided as the first type signal PNS1 (e.g., as shown in FIG. 8A), and the remaining partial downlink signals may be provided as the second type signal PNS2 (e.g., as shown in FIG. 8B). Alternatively, the first partial downlink signals DLa, the second partial downlink signals DLb, the third partial downlink signal DLca, the fourth partial downlink signal DLcb, and the fifth partial downlink signal DLd, among the first and second downlink signals DLSa and DLSb, may additionally be provided. Also, other partial downlink signals may be provided as the first type signal PNS1 (e.g., as shown in FIG. 8A). Alternatively, a portion of the first partial downlink signals DLa, the second partial downlink signals DLb, the third partial downlink signal DLca, the fourth partial downlink signal DLcb, and the fifth partial downlink signal DLd may be provided as the first type signal PNS1 (e.g., as shown in FIG. 8A), and another portion may be provided as the second type signal PNS2 (e.g., as shown in FIG. 8B).

Although three protocols are described as an example in FIGS. 12, 13, and 14, the protocol for communication between the input device PN (e.g., as shown in FIG. 6) and the electronic device ED (e.g., as shown in FIG. 6) is not necessarily limited thereto. For example, no matter what protocol is used, the input device PN (e.g., as shown in FIG. 6) may provide at least a portion of the transmitted downlink signal as the first type signal PNS1 (e.g., as shown in FIG. 8A), and the electronic device ED (e.g., as shown in FIG. 6) may receive the signal provided by the input device PN by sensing the magnetic field emitted from the input device PN.

According to an embodiment of the present disclosure, an input device PN might not only transmit a magnetic field signal, but may also transmit a downlink signal according to a predetermined protocol. For example, the input device PN may output at least a portion of the downlink signal according to an active pen protocol as the magnetic field signal. The magnetic field signal has a higher signal-to-noise ratio than an electric field signal. Accordingly, the input device PN may be made more accurate, for example, by increasing signal transfer. The magnetic field signal refers to a signal transmitted as the magnetic field (B-field), and the electric field signal refers to a signal transmitted as the electric field (E-filed).

In addition, since the input device PN transmits and receives the magnetic field signal and the electric field signal, the input device PN is compatible with various devices. For example, the input device PN may be compatible with an electronic device that does not include the digitizer and does not provide the uplink signal, an electronic device that provides the uplink signal, and an electronic device that includes the digitizer.

While the present disclosure has been described with reference to embodiments thereof, it will be apparent to those of ordinary skill in the art that various changes and modifications may be made thereto without departing from the spirit and scope of the present disclosure.

What is claimed is:

1. An input device, comprising:
   a housing;
   a power supply disposed within the housing;
   a controller disposed within the housing and configured to receive power from the power supply and to generate a signal;
   a resonance circuit disposed within the housing and configured to generate a first signal of a first type based on the signal received from the controller; and
   a conductor disposed within the housing and configured to transfer a second signal of a second type received from the controller, and
   wherein the first signal and the second signal have different waveforms from each other.

2. The input device of claim 1, wherein the first signal has a waveform with a varying amplitude, and the second signal has a waveform with a uniform amplitude.

3. The input device of claim 1, further comprising:
   a multiplexer connected between the conductor and the controller and also connected between the resonance circuit and the controller, and
   wherein the multiplexer selectively transfers either the signal received from the controller to the resonance circuit or transfers the second signal to the conductor.

4. The input device of claim 3, further comprising:
   a first pen tip connected to the conductor; and
   a second pen tip connected to the resonance circuit.

5. The input device of claim 1, further comprising:
   a pen tip that is selectively connected to either the conductor or the resonance circuit.

6. The input device of claim 5, further comprising:
   a multiplexer connected between the pen tip and the conductor, and also connected between the pen tip and the resonance circuit,
   wherein the multiplexer selectively transfers either the first signal to the pen tip or transfers the second signal to the pen tip.

7. The input device of claim 1, wherein the controller generates a down signal according to a predetermined protocol.

8. The input device of claim 7, wherein the downlink signal includes both the first signal and the second signal.

9. The input device of claim 7, wherein the downlink signal includes a position signal and a data signal, the position signal includes the first signal, and the data signal includes the second signal.

10. The input device of claim 7, wherein the downlink signal includes a position signal and a data signal, and the position signal and the data signal each include the first signal.

11. The input device of claim 7, wherein the predetermined protocol is a universal stylus initiative (USI), an active electrostatic protocol (AES), or a MICROSOFT pen protocol (MPP).

12. An interface device, comprising:
    an electronic device including a display layer and a sensor layer disposed on the display layer; and
    an input device configured to output a downlink signal according to a predetermined protocol including a first signal of a first type to the electronic device, and
    wherein the first signal has an amplitude that is varied over time.

13. The interface device of claim 12, wherein the electronic device and the input device communicate according to a predetermined protocol, the electronic device provides an uplink signal to the input device, and the downlink signal includes a position signal and a data signal.

14. The interface device of claim 13, wherein the position signal includes the first signal, the data signal includes the first signal or a second signal of a second type, and the second signal has a waveform with a uniform amplitude.

15. The interface device of claim 13, wherein the predetermined protocol is a universal stylus initiative (USI), an active electrostatic protocol (AES), or a MICROSOFT pen protocol (MPP).

16. The interface device of claim 12, wherein the input device includes:
    a housing;
    a power supply disposed within the housing;
    a controller disposed within the housing and configured to receive power from the power supply;
    a resonance circuit disposed within the housing and configured to generate the first signal based on a signal received from the controller; and
    a conductor disposed within the housing and configured to transfer a second signal of a second type that is received from the controller,
    wherein the first signal and the second signal have different waveforms from each other.

17. The interface device of claim 16, wherein the input device further includes:
    a multiplexer connected between the conductor and the controller and also connected between the resonance circuit and the controller, and
    wherein the multiplexer transfers the signal received from the controller to the resonance circuit or transfers the second signal to the conductor.

18. The interface device of claim 17, wherein the input device further includes:
    a first pen tip connected to the conductor; and
    a second pen tip connected to the resonance circuit.

19. The interface device of claim 16, wherein the input device further includes:
- a pen tip selectively connected to the conductor or the resonance circuit; and
- a multiplexer connected between the pen tip and the conductor and also connected between the pen tip and the resonance circuit,
- wherein the multiplexer selectively transfers either the first signal to the pen tip or transfers the second signal to the pen tip.

20. An input device, comprising:
- a power supply;
- a controller configured to receive power from the power supply ; and
- a resonance circuit configured to receive the a signal from the controller and to output a magnetic field,
- wherein the controller is configured to determine whether a type of signal to be transmitted is a magnetic field signal or an electric field signal, and
- wherein the controller generates a downlink signal according to a predetermined protocol and at least a portion of the downlink signal is provided as the magnetic field through the resonance circuit.

\* \* \* \* \*